US011171462B2

(12) United States Patent
Kashiwagi et al.

(10) Patent No.: US 11,171,462 B2
(45) Date of Patent: Nov. 9, 2021

(54) FIBER LASER APPARATUS

(71) Applicant: Furukawa Electric Co., Ltd., Tokyo (JP)

(72) Inventors: Kosuke Kashiwagi, Tokyo (JP); Akira Fujisaki, Tokyo (JP); Yoshihiro Emori, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 427 days.

(21) Appl. No.: 16/194,071

(22) Filed: Nov. 16, 2018

(65) Prior Publication Data

US 2019/0089113 A1 Mar. 21, 2019

Related U.S. Application Data

(63) Continuation of application No. 13/944,415, filed on Jul. 17, 2013, now Pat. No. 10,141,708, which is a (Continued)

(30) Foreign Application Priority Data

Jan. 18, 2011 (JP) .................................. 2011-007682
Aug. 31, 2011 (JP) .................................. 2011-188671

(51) Int. Cl.
*H01S 3/067* (2006.01)
*B23K 26/042* (2014.01)
(Continued)

(52) U.S. Cl.
CPC .......... *H01S 3/0675* (2013.01); *B23K 26/042* (2015.10); *H01S 3/067* (2013.01);
(Continued)

(58) Field of Classification Search
CPC ..... B23K 26/042; H01S 3/067; H01S 3/0675; H01S 3/06754; H01S 3/094003;
(Continued)

(56) References Cited

U.S. PATENT DOCUMENTS

| 5,530,710 A | 6/1996 | Grubb |
| 5,589,089 A | 12/1996 | Uesugi |

(Continued)

FOREIGN PATENT DOCUMENTS

| CN | 2645299 Y | 9/2004 |
| CN | 1845403 A | 10/2006 |

(Continued)

OTHER PUBLICATIONS

Office Action for EP Application 12736446.1, dated Dec. 6, 2019.
(Continued)

*Primary Examiner* — Dana Ross
*Assistant Examiner* — Joseph W Iskra
(74) *Attorney, Agent, or Firm* — Thompson Coburn LLP

(57) ABSTRACT

A fiber laser apparatus that generates invisible laser light using an amplification optical fiber having a core and that propagates a fundamental mode and a low-order mode is provided. The fiber laser apparatus includes a visible laser light source that generates visible laser light, an introducing section that introduces the visible laser light generated by the visible laser light source into a core of the amplification optical fiber, a cladding light attenuating section that attenuates light which has propagated through a cladding of the amplification optical fiber, at a subsequent stage of the amplification optical fiber, and a drive unit that drives the visible laser light source to emit the visible laser light through a core of the output optical fiber in a case of performing alignment of an irradiation position of the invisible laser light with respect to a workpiece.

22 Claims, 12 Drawing Sheets

Related U.S. Application Data continuation of application No. PCT/JP2012/050845, filed on Jan. 17, 2012.

(51) Int. Cl.
*H01S 3/23* (2006.01)
*H01S 3/094* (2006.01)
*H01S 3/0941* (2006.01)
*H01S 3/10* (2006.01)

(52) U.S. Cl.
CPC ........ *H01S 3/06754* (2013.01); *H01S 3/2391* (2013.01); *H01S 3/09415* (2013.01); *H01S 3/094003* (2013.01); *H01S 3/10038* (2013.01); *H01S 3/2375* (2013.01)

(58) Field of Classification Search
CPC ............. H01S 3/09415; H01S 3/10038; H01S 3/2375; H01S 3/2391
USPC .................................................. 219/121.81
See application file for complete search history.

(56) References Cited

U.S. PATENT DOCUMENTS

| | | | |
|---|---|---|---|
| 5,659,644 | A | 8/1997 | DiGiovanni et al. |
| 6,342,945 | B1 | 1/2002 | Allen et al. |
| 6,487,006 | B1 | 11/2002 | Chen |
| 7,649,914 | B2 | 1/2010 | Lewis |
| 7,777,891 | B2 | 8/2010 | Hasegawa |
| 8,081,376 | B2 | 12/2011 | Kakui et al. |
| 8,422,890 | B2 | 4/2013 | Mimuro et al. |
| 2002/0039227 | A1 | 4/2002 | Yamaguchi et al. |
| 2002/0149837 | A1 | 10/2002 | Sekimura |
| 2004/0033021 | A1 | 2/2004 | Oguri et al. |
| 2004/0176752 | A1 | 9/2004 | Alfano et al. |
| 2008/0130101 | A1 | 6/2008 | Kakui |
| 2008/0180787 | A1 | 7/2008 | DiGiovanni et al. |
| 2008/0267560 | A1 | 10/2008 | DiGiovanni et al. |
| 2009/0129410 | A1 | 5/2009 | Teshima et al. |
| 2010/0044353 | A1 | 2/2010 | Olsen |
| 2010/0163537 | A1 | 7/2010 | Furuta et al. |
| 2010/0188735 | A1 | 7/2010 | Tamaoki |
| 2011/0142084 | A1 | 6/2011 | Reid et al. |
| 2011/0228382 | A1 | 9/2011 | Mattsson et al. |
| 2011/0277361 | A1* | 11/2011 | Nichol .................. G02B 6/006 40/541 |
| 2011/0305256 | A1* | 12/2011 | Chann ................ G02B 27/0905 372/75 |

FOREIGN PATENT DOCUMENTS

| | | | |
|---|---|---|---|
| CN | 1330285 | A | 8/2007 |
| CN | 101266379 | A | 9/2008 |
| CN | 101276988 | A | 10/2008 |
| CN | 101350491 | A | 1/2009 |
| JP | S61-200503 | A | 9/1986 |
| JP | S62-8748 | A | 1/1987 |
| JP | H07-116878 | A | 5/1995 |
| JP | 2000126886 | * | 5/2000 |
| JP | 2000126886 | A | 5/2000 |
| JP | 3247292 | B2 | 1/2002 |
| JP | 2003-8114 | A | 1/2003 |
| JP | 2003-202422 | A | 7/2003 |
| JP | 2003-285189 | A | 10/2003 |
| JP | 2004-288840 | A | 10/2004 |
| JP | 2005-013348 | A | 1/2005 |
| JP | 2007-42981 | A | 2/2007 |
| JP | 2007-81076 | A | 3/2007 |
| JP | 2007-123594 | A | 5/2007 |
| JP | 2007173346 | A | 7/2007 |
| JP | 2007-240258 | A | 9/2007 |
| JP | 2007-294931 | A | 11/2007 |
| JP | 2008-021910 | A | 1/2008 |
| JP | 2008-147389 | A | 6/2008 |
| JP | 2008-187100 | A | 8/2008 |
| JP | 2008-268747 | A | 11/2008 |
| JP | 2008-276233 | A | 11/2008 |
| JP | 2009-16804 | A | 1/2009 |
| JP | 2009-512208 | A | 3/2009 |
| JP | 2009-69492 | A | 4/2009 |
| JP | 2009-178720 | A | 8/2009 |
| JP | 2009-212441 | A | 9/2009 |
| JP | 2010-1193 | A | 1/2010 |
| JP | 2010-508149 | A | 3/2010 |
| JP | 2010-105018 | A | 5/2010 |
| JP | 2010-129886 | A | 6/2010 |
| JP | 2010-147108 | A | 7/2010 |
| JP | 2010-167433 | A | 8/2010 |
| JP | 2010-171322 | A | 8/2010 |
| JP | 2010-232650 | A | 10/2010 |
| JP | 2010263188 | A | 11/2010 |
| WO | 2007034802 | A1 | 3/2007 |
| WO | 2008/052547 | A1 | 5/2008 |
| WO | 2008/123609 | A1 | 10/2008 |
| WO | 2010060435 | A1 | 6/2010 |
| WO | 2010142039 | A1 | 12/2010 |

OTHER PUBLICATIONS

Decision to Grant JP Application No. 2014-265067 dated Aug. 15, 2016.
Decision to Grant JP Application No. 2014-265068 dated Aug. 15, 2016.
Extended European Search Report (dated May 18, 2017) in the corresponding EP Application No. 12736446.1.
International Search Report for PCT/JP2012/050845 dated Apr. 17, 2012 and English translation.
Japanese Patent Application No. 2013-194472, Decision to Grant a Patent dated Dec. 16, 2013.
Notice of Opposition to the corresponding JP Patent No. 6007237, dated May 9, 2017.
Notice of Opposition to the corresponding JP Patent No. 6007238, dated May 9, 2017.
Office Action for CN Application 201280005558.8 dated Oct. 8, 2014.
Office Action dated Jan. 25, 2016 in a counterpart Japanese application No. 2014-265067 and its English translation.
Office Action dated Jan. 25, 2016 in a counterpart Japanese application No. 2014-265068 and its English translation.
Office Action for JP2012-553731.
Submission of Publications etc. dated Mar. 2, 2016 in a counterpart JP Application No. 2014-265067.
Suematsu et al., "Introduction to Optical Fiber Communications", 2006, pp. 18-27, ISBN: 978-4-274-20198-1, Japan.
Written Opinion for PCT/JP2012/050845 dated Apr. 17, 2012 and English translation.
Yamashita, "Book to understand the mechanism of optical fiber communications", 2002, pp. 80-83, ISBN: 4-7741-1436-7, Japan.

* cited by examiner

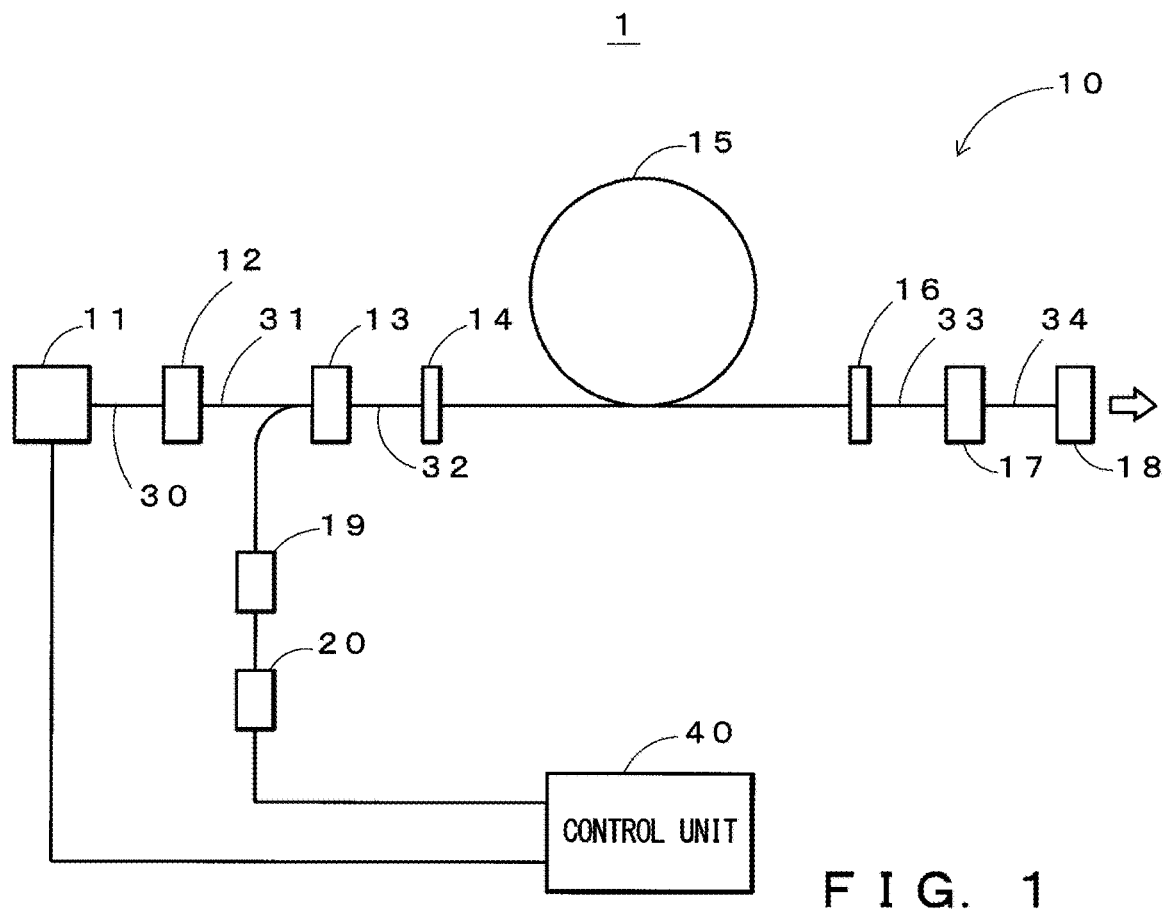
F I G. 1
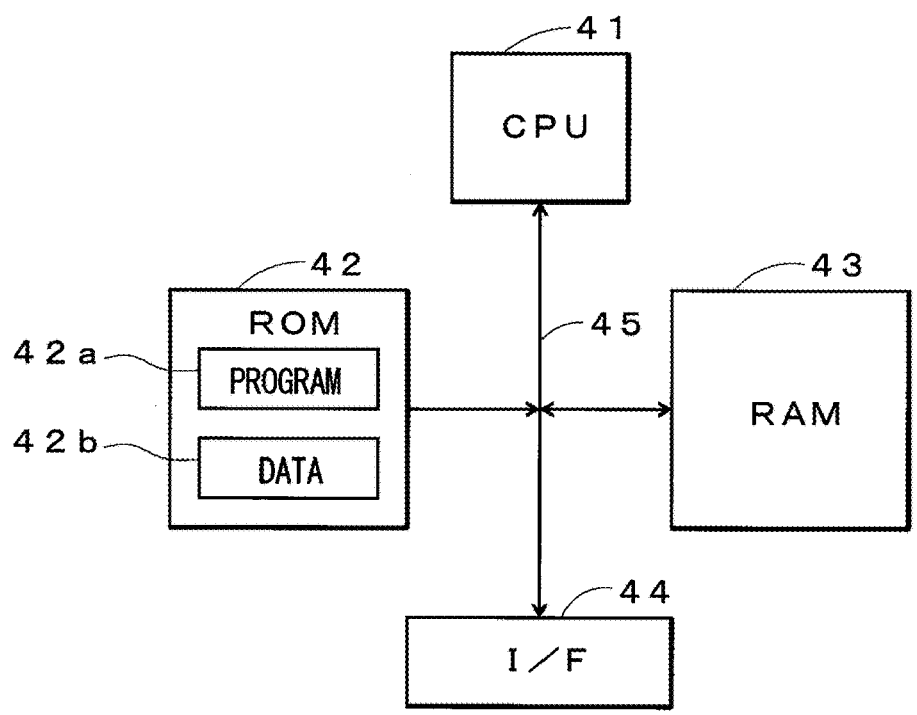
F I G. 2

FIBER LASER APPARATUS

CROSS REFERENCE TO RELATED APPLICATIONS

This patent application is a continuation application of U.S. patent application Ser. No. 13/944,415, entitled "Fiber Laser Apparatus and Method of Aligning Laser Light Irradiation Position", filed Jul. 17, 2013, and now U.S. Pat. No. 10,141,708, which is a continuation application of International Patent Application No. PCT/JP2012/050845 filed Jan. 17, 2012, which claims the benefit of Japanese Patent Application Nos. 2011-007682 and 2011-188671 filed Jan. 18, 2011 and Aug. 31, 2011, respectively, the full contents of each application are hereby incorporated by reference in their entirety.

BACKGROUND

Technical Field

The present disclosure relates to a fiber laser apparatus and a method of aligning a laser light irradiation position.

Background

When processing a workpiece using laser light, it is necessary to perform alignment for determining a position on a workpiece whereto laser light is to be irradiated.

In the related art, for example, as described in Japanese Laid-Open Patent Publication Nos. 2005-13348 and H07-116878, in the case of invisible laser light, since laser light is not visible, there exists a technique of performing alignment using visible laser light by adjusting an optical axis of invisible laser light and an optical axis of visible laser light to match with each other using a half mirror or the like.

Japanese Laid-Open Patent Publication No. S62-008748 discloses a technique in which an optical fiber that guides visible laser light is arranged in parallel with an optical fiber that guides invisible laser light, and collecting the laser light outputted from each fiber at an emitting section with a lens, and collecting them at the same position at a predetermined distance from the emitting section.

According to the techniques disclosed in Japanese Laid-Open Patent Publication Nos. 2005-13348, No. H07-116878 and S62-008748, since guiding routes of the invisible laser light and the visible laser light are different, there is a drawback that irradiation positions on the workpiece do not match and, as a result, alignment cannot be performed accurately.

Accordingly, it is an object of the present disclosure to provide a fiber laser apparatus and a method of aligning a laser irradiation position that can perform alignment accurately.

SUMMARY

In order to achieve the above object, a fiber laser apparatus according to an aspect of the present disclosure is a fiber laser apparatus that generates invisible laser light using an amplification optical fiber having a single-mode core and outputs the invisible laser light via an output optical fiber, the fiber laser apparatus including a visible laser light source that generates visible laser light, an introducing section that introduces the visible laser light generated by the visible laser light source into a core of one of the amplification optical fiber and the output optical fiber, and a drive unit that, in a case of performing alignment of an irradiation position of the invisible laser light with respect to a workpiece, drives the visible laser light source and emits the visible laser light via the core of the output optical fiber.

With such a configuration, an accurate alignment can be performed.

In addition to the above configuration, according to another configuration, the introducing section introduces the visible laser light generated by the visible laser light source into the core of one of the amplification optical fiber and the output optical fiber, and attenuates return light that propagates through the core in a reverse direction while generating the invisible laser light, the return light being incident on the visible laser light source.

With such a configuration, it is possible to perform the alignment accurately and a breakage of the visible laser light source by the return light can be prevented.

In addition to the above configuration, according to another configuration, the introducing section has a wavelength selective coupling-splitting element that at least has two input terminals and one output terminal, the visible laser light from the visible laser light source being entered into one of the input terminals, laser light emitted from the output terminal being introduced into the core of one of the amplification optical fiber and the output optical fiber, return light that propagates in the reverse direction in the core during generation of the invisible laser light and entered into the output terminal being propagated to the other input terminal, return light that propagates to the one of the input terminals being attenuated.

With such a configuration, a damage on the visible laser light source by return light can be prevented and also visible laser light can be introduced into the core efficiently.

In addition to the above configuration, according to another configuration, the wavelength selective coupling-splitting element is one of a fused fiber type and a polished type.

With such a configuration, since wavelength selection can be performed without using a space coupled system, a damage due to power concentration at an input output end can be prevented.

In addition to the above configuration, according to another configuration, the fiber laser apparatus further includes an optical resonator that generates the invisible laser light, the wavelength selective coupling-splitting element being provided on one of an input side and an output side of the optical resonator.

With such a configuration, the alignment of invisible laser light outputted from an optical resonator can be performed accurately.

In addition to the above configuration, according to another configuration, the fiber laser apparatus further include an optical resonator that generates the invisible laser light and an optical amplifier that amplifies the invisible laser light generated by the optical resonator, the wavelength selective coupling-splitting element being provided on an input side of the optical resonator, between optical resonator and the light amplifier, or on an output side of the optical resonator.

With such a configuration, an intensity of invisible laser light is increased and the alignment can be performed accurately.

In addition to the above configuration, according to another configuration, the fiber laser apparatus further includes a filter that selectively attenuates the invisible laser light included in the return light, the filter being provided between the visible laser light source and the wavelength selective coupling-splitting element.

With such a configuration, a damage on the visible laser light source by return light can be prevented by increasing an attenuation ratio of the return light and visible laser light can be introduced into the core efficiently.

In addition to the above configuration, according to another configuration, the introducing section has an optical fiber that connects an emitting section of the visible laser light source with a core of the amplification optical fiber.

With such a configuration, since visible laser light can be directly introduced into the core of the amplification optical fiber, an optical axis of the visible laser light and an optical axis of the invisible laser light can be matched and the alignment can be performed accurately.

In addition to the above configuration, according to another configuration, the introducing section has a pump light multiplexer that connects an emitting section of the visible laser light source with a cladding of the amplification optical fiber.

With such a configuration, the return light to the visible laser light source can be reduced and a longer life of the visible laser light source can be achieved.

In addition to the above configuration, according to another configuration, a core light attenuating section that attenuates core light is disposed between the visible laser light source and the introducing section.

With such a configuration, by attenuating the return light to the visible laser light source, a longer life of the visible laser light source can be achieved.

In addition to the above configuration, according to another configuration, an optical filter that transmits the visible laser light and attenuates the invisible laser light is disposed between the visible laser light source and the introducing section.

With such a configuration, by attenuating the return light to the visible laser light source only and transmitting the visible laser light, a longer life of the visible laser light source can be achieved and also a range of choices of the visible laser light source can be broadened.

In addition to the above configuration, according to another configuration, the fiber laser apparatus further includes a cladding light attenuating section that attenuates light that propagates through the cladding of the amplification optical fiber.

With such a configuration, since the visible laser light that has leaked out from the core to the cladding can be attenuated, a beam quality can be improved and a spot diameter can be made smaller.

In addition to the above configuration, according to another configuration, the fiber laser apparatus further includes a plurality of the amplification optical fibers each generating the invisible laser light and a combining unit that receives and combines invisible laser lights outputted from the plurality of amplification optical fibers inputted via a plurality of input ends, the introducing section introducing the visible laser light to one of the input ends of the combining unit.

With such a configuration, alignment of a high output invisible laser light outputted from a plurality of amplification optical fibers can be facilitated.

In addition to the above configuration, according to another configuration, the introducing section introduces the visible laser light into an input end whereto invisible laser light from the amplification optical fiber is not inputted, among the plurality of input ends of the combining units.

With such a configuration, since invisible laser light does not pass through a wavelength selective coupler-splitter, a power tolerance required by the wavelength selective coupler-splitter can be reduced.

In addition to the above configuration, according to another configuration, a wavelength of the visible laser light has a wavelength corresponding to red or green.

With such a configuration, since visibility can be increased, alignment can be facilitated.

According to another aspect of the present disclosure, a method of aligning a laser light irradiation position in which invisible laser light is generated using an amplification optical fiber having a single-mode core and outputted via an output optical fiber is provided which includes introducing the visible laser light generated by a visible laser light source that generates visible laser light into a core of one of the amplification optical fiber and the output optical fiber, and determining an irradiation position of the invisible laser light with respect to a workpiece by the visible laser light emitted via the core of the output optical fiber.

With such a method, an accurate alignment can be performed.

According to the present disclosure, a fiber laser apparatus and a method of aligning a laser irradiation position are provided that can perform alignment accurately.

BRIEF DESCRIPTION OF DRAWINGS

FIG. 1 is a diagram showing an exemplary configuration of a first embodiment of the present disclosure.

FIG. 2 is a diagram showing an exemplary configuration of a control unit shown in FIG. 1.

DETAILED DESCRIPTION

Figure 3:
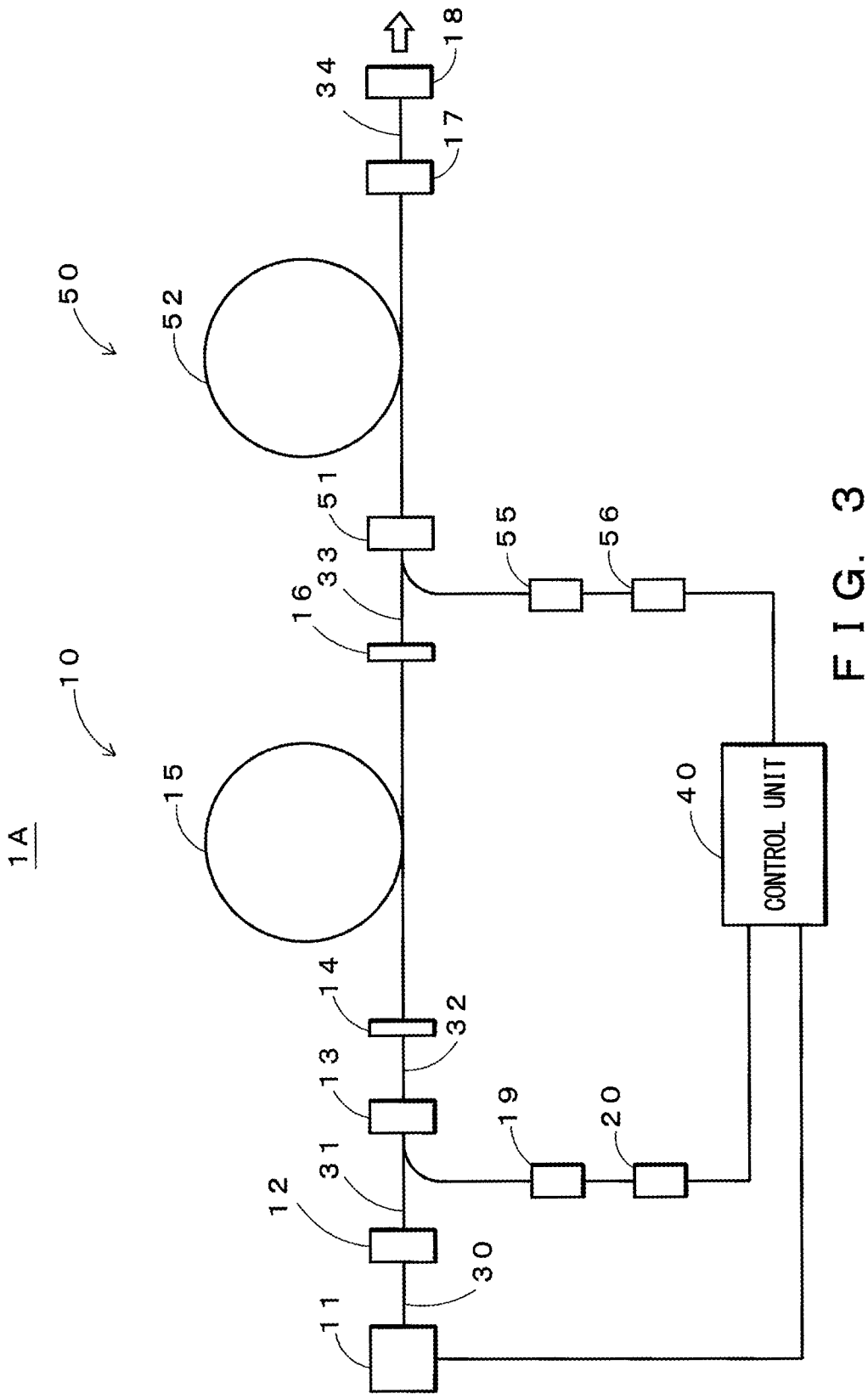
FIG. 3 is a diagram showing an exemplary configuration of a second embodiment of the present disclosure.

Further features of the present disclosure will become apparent from the following detailed description of exemplary embodiments with reference to the accompanying drawings.

(A) First Embodiment

FIG. 1 is a diagram showing an exemplary configuration of a first embodiment of the present disclosure. As shown in FIG. 1, a fiber laser apparatus 1 of the first embodiment includes, as its main constituent elements, a visible light LD 11 (corresponds to a "visible laser light source" in the claims), an attenuating section 12 (corresponds to an "attenuating section" in the claims), a pump light multiplexer 13, an HR (High Reflector) 14, an amplification optical fiber 15, an OC (Output Coupler) 16, a cladding mode removing section 17, a light output section 18, a pumping laser diode (Laser Diode) 19, a pumping LD driving power supply 20, optical fibers 30 and 31 (each corresponds to an "introducing section" in the claims), optical fibers 32 and 33, an optical fiber 34 (an "output optical fiber" in the claims) and a control unit 40 (corresponds to a "drive unit" in the claims). The pump light multiplexer 13, the HR 14, the amplification optical fiber 15 and the OC 16 are main constituent elements of a laser oscillation device 10.

The visible light LD 11 is, for example, constituted by a laser diode that produces red laser light, which is visible light. Hereinafter, in each embodiment, the visible light LD 11 may be directly coupled to a core of the optical fiber 30 or may be configured as a pigtail-type semiconductor laser module having an output optical fiber and the core of the output optical fiber and the core of the optical fiber 30 of the optical fiber may be connected. In a case where it is configured as a pigtail-type semiconductor laser module, an output optical fiber may be a single-mode optical fiber. The attenuating section 12 has a function of attenuating a certain amount of core light propagating through the core of the optical fibers 30, 31. Specifically, it is constituted by a fusion-bonded section or the like in which optical axes are coupled with the optical axes being offset, and attenuates return light that has propagated through the core from the pump light multiplexer 13 and similarly attenuates the visible laser light from the visible light LD 11. In the example of FIG. 1, the fusion-bonded section where the optical components are connected are omitted to simplify the explanation thereof.

The pump light multiplexer 13 is, for example, constituted by a TFB (Tapered Fiber Bundle) or the like and introduces laser light outputted from the pumping LD 19 into a cladding of the optical fiber as a pump light. The HR 14 is a high reflection fiber grating (FBG) made by periodically changing a refractive index of the optical fiber and reflects laser light from the amplification optical fiber 15 at a reflectivity near 100%. The amplification optical fiber 15 is, for example, a DCF (Double Clad Fiber) having a single-mode core doped with ions of rare earth elements such as Er (Erbium) and Yb (Ytterbium), and, for example, by exciting the ions doped in the core by pump light introduced from outside, infrared laser light of, for example, 1080 nm is oscillated and outputted. The DCF in the present embodiment is configured to include two layers of claddings formed outside the aforementioned single-mode core, and the pump light to propagate inside an inner cladding, but the core is not limited to single mode, and may be a multimode core (e.g., a core through which a fundamental mode and several low order modes are propagated).

Similarly to the HR 14, the OC 16 is formed by periodically changing the refractive index of the optical fiber, and passes a part (e.g., 10%) of the laser light from the amplification optical fiber 15 and reflects the remaining part. It is to be noted that an optical fiber resonator is constituted by the HR 14, the amplification optical fiber 15 and the OC 16.

The cladding mode removing section 17 removes light that propagates through the cladding of the optical fiber 33. The cladding mode removing section 17 is formed by removing, for example, the cladding outside the double cladding and applying, to a part where the cladding was removed, a substance having a refractive index that is higher than that of an inner cladding. Of course, it may be a configuration other than this.

The pumping LD 19 is, for example, constituted by one or more multimode laser diodes having a wavelength of 915 nm and an output light intensity of several Watts or more. The pumping LD driving power supply 20 drives the pumping LD 19 in response to a control by the control unit 40. The optical fibers 30 to 34 are, for example, constituted by single-mode fibers and transmit laser light as signal light.

As shown in FIG. 2, the control unit 40 includes, as its main constituent elements, a CPU (Central Processing Unit) 41, a ROM (Read Only Memory) 42, a RAM (Random Access Memory) 43, an I/F (Interface) 44 and a bus 45. Here, the CPU 41 controls each part based on a program 42a and data 42b stored in the ROM 42. The ROM 42 is a nonvolatile semiconductor storage device, and stores the program 42a and the data 42b. The RAM 43 is a volatile semiconductor storage device, and operates as a work area when the CPU 41 executes a program. The I/F 44 is, for example, constituted by a DAC (Digital Analog Converter) and an ADC (Analog Digital Converter). The I/F 44 converts digital data supplied from the CPU 41 into an analog signal and supplies it to the pumping LD driving power supply 20 and the visible light LD 11. The bus 45 is a signal line group that mutually connects the CPU 41, the ROM 42, the RAM 43 and the I/F 44, and enables sending/receiving of data therebetween. Note that, in this embodiment, a CPU or the like is used as the control unit 40. However, the present embodiment is not limited to such a case, and for example, a DSP (Digital Signal Processor) may be used, or instead of a digital control system, an analog control system may be used.

With Vp (mW) being an output intensity of the visible light LD 11, L (dB) being an attenuation in the attenuating section 12, and Fp (mW) being an intensity of the return light that returns from the pump light multiplexer 13 by mainly propagating through a single mode core, an attenuation in the attenuating section 12 and an output intensity of the visible light LD 11 can be, for example, set to satisfy the following equations.

[Equation 1]

$$Vp \times 10^{-\frac{L}{10}} \times 10^{-\frac{10}{10}} \geq 2 \ \mu W \quad (1)$$

[Equation 2]

$$Fp \times 10^{-\frac{L}{10}} \leq 10 \ mW \quad (2)$$

Here, a second part on the left-hand side Equation (1) represents an attenuation in the attenuating section 12, and a third part represents a loss in the laser oscillation device 10 such as in the pump light multiplexer 13, the HR 14, the OC 16 and the amplification optical fiber 15. Note that, in Equation (1), for the sake of simplification, an amount of loss in the laser oscillation device 10 is assumed to be 10 dB. However, it is not limited thereto, and may take any value depending on the configuration of the laser oscillation device 10. In other words, Equation (1) is an equation that requires that a visible intensity of greater than or equal to 2 μW is ensured even if a visible laser light emitted by the visible light LD 11 and having an intensity Vp (mW) is attenuated by the attenuating section 12 and the laser oscillation device 10 and thereafter irradiated to a workpiece. Note that, depending on the workpiece and the operating environment, a value other than 2 μW may be employed. Equation (2) is an equation that requires that, in a case where an intensity of the return light from the pump light multiplexer 13 when the fiber laser apparatus 1 is irradiating infrared laser light is Fp (mW), an intensity of the return light after the attenuation in the attenuating section 12k is less than or equal to 10 mW. This is a requirement for preventing the visible light LD 11 from being damaged by the return light. A setting method includes, first, measuring an intensity of the return light Fp, then, setting the attenuation L in the attenuating section 12 to satisfy the Equation (2) from the visible light LD 11 protection point of view, and determining an output of the visible light LD 11 that satisfies Equation (1). To be more precise, since it is assumed that there is a case where the attenuation L in Equations (1) and (2) take different values due to wavelength dependency, it is more desirable to determine these values by taking the wavelength into consideration.

Note that, in a case where the visible light LD 11 having an intensity that satisfies Equation (1) does not exist, it is possible to broaden the range of choices of the visible light LD 11 by using an optical filter that transmits visible light and attenuates infrared light (e.g., LPF or BPF that has a pass band in a visible light range and a cut-off band in an infrared light range) as the attenuating section 12, and making "L" in Equation (1) and Equation (2) different. Specifically, when L1 is an attenuation for the visible light in the attenuating section 12 and L2 is an attenuation for the return light having infrared radiation as its main component, Equations (1) and (2) will become equations as follows.

[Equation 3]

$$Vp \times 10^{-\frac{L1}{10}} \times 10^{-\frac{10}{10}} \geq 2 \text{ μW} \quad (3)$$

[Equation 4]

$$Fp \times 10^{-\frac{L2}{10}} \leq 10 \text{ mW} \quad (4)$$

As an example, when L1≈0 dB and L2≈20 dB, since only the return light can be attenuated to about 1/100, it is possible to broaden the range of choices of the visible light LD 11.

Next, an operation of the first embodiment will be described. In a step prior to processing a workpiece, the control unit 40 controls operations of both the visible light LD 11 and the pumping LD 19 to be in a stopped state. In such a state, when a workpiece is placed on a working table, not shown, and an operation for determining the position (alignment) whereto infrared laser light is irradiated is carried out (e.g., when a "alignment button", not shown, is operated), the CPU 41 of the control unit 40 detects this operation through the I/F 44. The CPU 41 performs a process of performing alignment based on the program 42a. Specifically, based on the program 42a, the CPU 41 obtains control data from the data 42b, performs a D/A conversion by the I/F 44 and then supplies it to the visible light LD 11. As a result, for example, the visible light LD 11 emits red visible light laser. The laser light emitted by the visible light LD 11 enters the core of the optical fiber 30 and, a certain quantity is attenuated in the attenuating section 12. The visible light laser which has passed through the attenuating section 12 passes through the pump light multiplexer 13, the HR 14, the amplification optical fiber 15, the OC 16 and the cladding mode removing section 17. Then, the visible light laser is emitted from the light output section 18 and irradiated on the working position (a position at which the infrared laser light is irradiated) of the workpiece.

Here, similarly to the infrared laser light, the visible laser light passes a core of each of the optical fibers 30 to 34 and the amplification optical fiber 15, and, since the cores of the optical fibers 30 to 34 and the amplification optical fiber 15 are a single-mode type, an optical axis of the visible laser light and an optical axis of the infrared laser light match, and there is no offset in the irradiation position. Since the visible laser light has a wavelength different from the wavelength of the infrared laser light that the fiber laser apparatus 1 attempts to transmit in a single mode, a part of the visible laser light leaks from the core to the cladding. However, since such laser light is removed when passing through the cladding mode removing section 17, a small spot diameter can be obtained without a focal point being blurred by light propagating in the cladding. Note that, although the visible laser light is attenuated while passing through the laser oscillation device 10, visibility can be ensured by a layout that satisfies Equation (1) (or Equation (3)).

Thus, since the visible laser light emitted from the visible light LD 11 is irradiated, prior to the processing, on a position of the workpiece where the infrared laser light is irradiated, the processing position can be positioned accurately.

Note that, for example, in the fiber laser apparatus 1, there may be a case where the optical fibers 30 to 34, the amplification optical fiber 15 and other optical components are damaged by a so-called "fiber fuse" that causes an irreversible thermal change in the core of the optical fiber. In such a case, since light does not propagate through the core, for example, when the visible laser light is not emitted from the light output section 18, it can be determined that the fiber fuse or the like has occurred. Also, in a case where a fiber fuse has occurred, the laser light propagates to a point near the point where the fiber fuse has reached and the laser light is scattered at the point reached. Therefore, it is possible to know how far the fiber fuse has progressed by identifying a portion where the visible light is scattered.

When the alignment is completed, the control unit 40 stops the irradiation from the visible light LD 11. Thereby, the irradiation of the visible laser light onto a workpiece is stopped. Subsequently, when an instruction to start the processing is given, the CPU 41 obtains data for driving the pumping LD 19 in response to an irradiation intensity from the data 42b, and delivers it to the I/F 44. The I/F 44 carries out D/A conversion of the delivered data for driving and delivers it to the pumping LD driving power supply 20. The pumping LD driving power supply 20 drives the pumping LD 19 in response to an instructed value supplied from the I/F 44. As a result, the pumping LD 19 emits pump light and introduces it into a cladding of the amplification optical fiber 15 via the pump light multiplexer 13. Thereby, laser resonance occurs in the HR 14, the OC 16 and the amplification optical fiber 15. The infrared laser light is emitted from the OC 16, and after residual pump light is removed in the cladding mode removing section 17, it is irradiated onto a workpiece via the light output section 18. Since a position whereto the infrared laser light is irradiated is substantially the same as a position whereto the visible light laser is irradiated, a desired position can be processed by the infrared laser light. Note that, during the laser processing, for example, light that has transmitted through the HR 14 becomes return light, and since such return light is attenuated by the attenuating section 12 to satisfy Equation (2) or Equation (4), the return light incident on the visible light LD 11 is kept at 10 mW or below, it is possible to prevent the visible light LD 11 from being damaged or the life from being shortened.

When a process using the infrared laser light is completed, the CPU 41 stops driving the pumping LD 19. Thereby, irradiation of the infrared laser light from the fiber laser apparatus 1 is stopped.

As has been explained above, according to the first embodiment of the present disclosure, since the visible laser light emitted from the visible light LD 11 is introduced into the core of the optical fiber, the infrared laser light and the visible laser light are made coaxial by providing the same passage path, and alignment can be performed accurately.

Also, in the aforementioned first embodiment, since the cladding mode removing section 17 is provided, by removing light leaking from the core, beam quality of the visible laser light can be improved and a reduced spot diameter can be obtained.

Also, in the aforementioned first embodiment, since the attenuating section 12 is provided and the return light is attenuated to a predetermined level, damages on the visible light LD 11 due to the return light can be prevented. Further, when the intensity of the return light is low, production cost can be reduced by using a component that does not have a wavelength dependency (e.g., a fusion-bonded point or the like where the optical axes are offset) as the attenuating section 12. Also, by using an optical filter that selectively attenuates the infrared laser light, a range of choices of the visible light LD 11 can be broadened even if an output intensity of the fiber laser apparatus 1 is high.

(B) Second Embodiment

FIG. 3 is a diagram showing an exemplary configuration of the second embodiment of the present disclosure. In FIG. 3, since components corresponding to those in FIG. 1 are labeled with the same reference numerals, an explanation thereof is omitted. As compared to the case of FIG. 1, a fiber laser apparatus 1A of the second embodiment shown in FIG. 3 includes a laser amplifying device 50 that is added downstream of the laser oscillation device 10. The remaining configuration is similar to the configuration in FIG. 1. The laser amplifying device 50 includes a pump light multiplexer 51, an amplification optical fiber 52, a pumping LD 55 and a pumping LD driving power supply 56. Laser light emitted from the laser oscillation device 10 is inputted into the core as signal light and pump light emitted from the pumping LD 55 enters the cladding. The signal light is amplified in the amplification optical fiber 52 and outputted via the light output section 18 after having removed the pump light in the cladding mode removing section 17. The control unit 40 obtains a light output of a desired intensity by controlling the pumping LD driving power supplies 20 and 56.

Note that, in the second embodiment, the visible laser light outputted from the visible light LD 11 may be attenuated in the laser amplifying device 50 as well as in the laser oscillation device 10. Therefore, the aforementioned Equation (1) and Equation (3) changes into the following Equation (5) and Equation (6), with an exponent part of the third part on the left-hand side being changed from (−10/10) to (−20/10), for example. Of course, depending on the configuration of the laser amplifying device 50, other value may be used.

[Equation 5]

$$Vp \times 10^{-\frac{L}{10}} \times 10^{-\frac{20}{10}} \geq 2 \ \mu W \tag{5}$$

[Equation 6]

$$Vp \times 10^{-\frac{L1}{10}} \times 10^{-\frac{20}{10}} \geq 2 \ \mu W \tag{6}$$

Note that, an operation of the second embodiment is similar to the operation of the first embodiment except that the aforementioned Equations (5) and (6) are different and the infrared laser light is amplified in the laser amplifying device 50. In the second embodiment, the visible laser light emitted from the visible light LD 11 is introduced into the core of the optical fiber 30, and after attenuated by the attenuating section 12, it is introduced into the core of the amplification optical fiber 15 via the optical fiber 31 and the pump light multiplexer 13. The visible laser light emitted from the core of the amplification optical fiber 15 passes through the pump light multiplexer 51 and the amplification optical fiber 52 and after the light which has leaked into the cladding is removed by the cladding mode removing section 17, emitted towards a workpiece from the light output section 18 via the core of the optical fiber 34.

According to the fiber laser apparatus 1A of the second embodiment explained above, similarly to the first embodiment, by guiding the visible laser light to the core of the amplification optical fiber 15 through the optical fibers 30 and 31, the passage paths of the infrared laser light and the visible laser light can be matched and optical axes can be matched. Thereby, by referring to an irradiation position of the visible laser light, it is possible to accurately know a position where the infrared laser light is to be irradiated. Therefore, the alignment for the processing can be performed accurately. Also, since cladding mode removing section 17 is provided, a beam quality of the visible laser light is improved by removing the visible laser light which has leaked from the core, and a smaller spot diameter can be obtained. Further, since the attenuating section 12 is provided and the return light is attenuated to a predetermined level, damages on the visible light LD 11 by the return light can be prevented. It is to be noted that, as has been described above, a component that does not have a wavelength dependency or a component having a wavelength dependency can be used as the attenuating section 12.

(C) Third Embodiment

Figure 4:
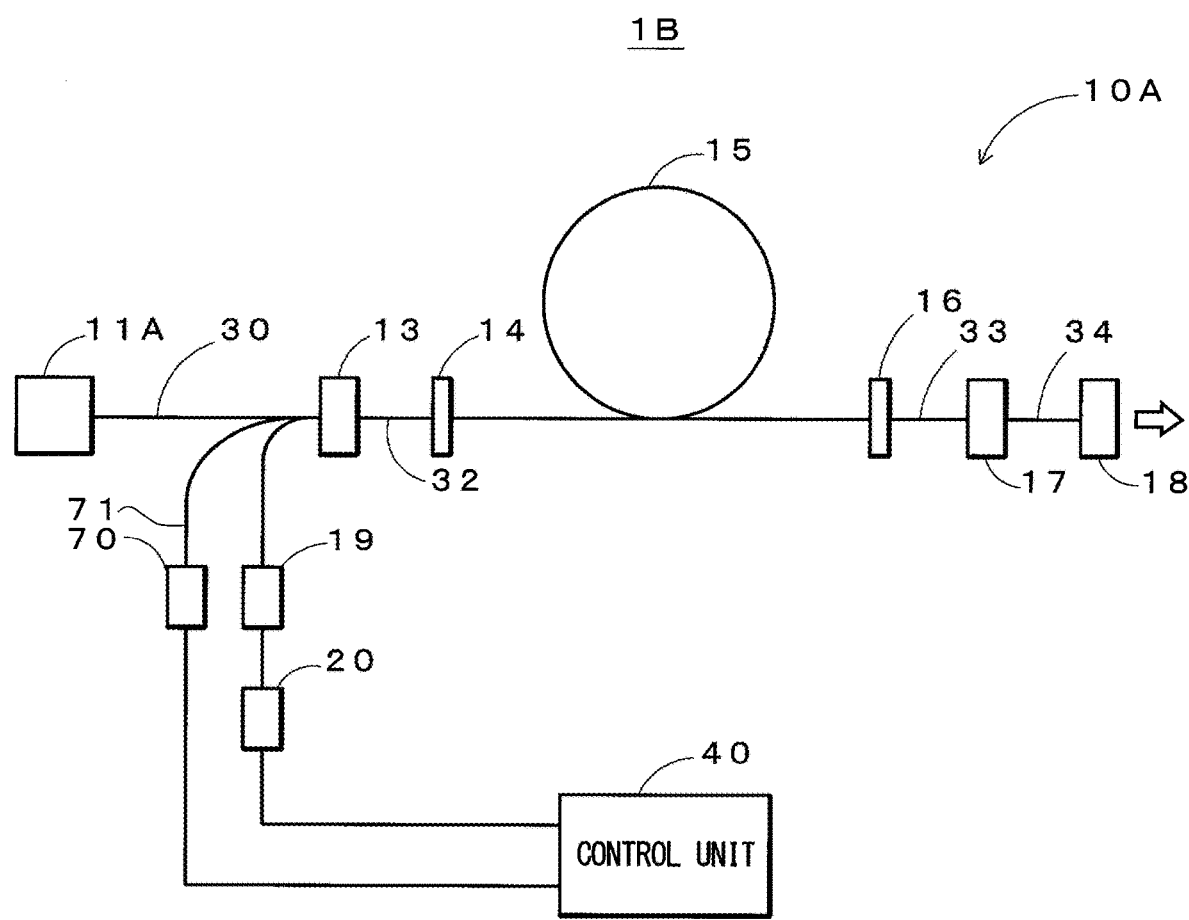
FIG. 4 is a diagram showing an exemplary configuration of a third embodiment of the present disclosure.

FIG. 4 is a diagram showing an exemplary configuration example of the third embodiment of the present disclosure. In FIG. 4, since components corresponding to those in FIG.

1 are labeled with the same reference numerals, an explanation thereof is omitted. As compared to the case of FIG. 1, in a fiber laser apparatus 1B of the third embodiment shown in FIG. 4, the visible light LD 11 is replaced with a terminating section 11A and the attenuating section 12 is eliminated. Further, a visible light LD 70 is newly added, and output light of a visible light LD 70 is inputted into a pump light introducing fiber 71 (corresponds to an "introducing section" in the claims) of the pump light multiplexer 13. The visible light LD 70 is controlled by the control unit 40. The remaining configuration is similar to the configuration in FIG. 1.

The terminating section 11A includes, for example, a seed light source that generates seed light, a PD (Photo Diode) that detects leaking light, an attenuating section in which an optical fiber is wound, or the like. Similarly to the visible light LD 11, the visible light LD 70 is, for example, a laser diode emitting red laser light that is visible light. The pump light introduction fiber 71 is one of a plurality of pump light introduction fibers of the pump light multiplexer 13, and pump light is introduced into a cladding of the amplification optical fiber 15 via this pump light introduction fiber.

In the example of FIG. 4, the visible laser light emitted by the visible light LD 70 is introduced into the pump light introduction fiber 71 of the pump light multiplexer 13 and introduced into the cladding of the optical fiber 32 by the pump light multiplexer 13. For example, a part of the visible laser light introduced into the cladding changes to a core propagation mode at a portion such as a fusion-bonded point where disturbance is caused in the propagating mode to be introduced into the core, and becomes core light that propagates through the core. In other words, it becomes light that is coaxial with the infrared laser light. In the cladding mode removing section 17, the visible laser light remaining in the cladding is removed and is irradiated onto a workpiece via the light output section 18.

In the third embodiment, since the visible laser light is introduced into the cladding of the optical fiber 32 via the pump light multiplexer 13, the optical fiber 30 need not be provided with an attenuating section 12 for suppressing return light to the visible light LD. In this case, in Equations (1) and (2), an attenuation L of the attenuating section 12 is, as has been described above, set as a loss value for a case where the visible laser light outputted from the core of the output fiber of the visible light LD 70 is coupled to the core of the optical fiber 32 via the pump light introduction fiber 71 of the pump light multiplexer 13.

In this manner, in the third embodiment shown in FIG. 4, visible laser light is introduced into the cladding of the amplification optical fiber 15 by the pump light multiplexer 13, and when propagating through the cladding of the amplification optical fiber 15, a part of the visible laser light becomes core light that is introduced into the core and becomes light that is coaxial with the infrared laser light and is irradiated onto the workpiece. The remaining operation is similar to the operation in FIG. 1.

With the fiber laser apparatus 1B of the third embodiment described above, when propagating light introduced into the cladding by the pump light multiplexer 13, a part of the light is introduced into the core. Thereby, similarly to the case of the first embodiment, by matching the passage paths of the infrared laser light and the visible laser light and matching the optical axes, it is possible to accurately know a position where the infrared laser light is to be irradiated. Therefore, the alignment for the processing can be performed accurately. Also, since the visible laser light leaked from the core is removed by providing the cladding mode removing section 17, a beam quality of the visible laser light can be improved and a smaller spot diameter can be obtained.

Also, in the third embodiment, since the visible light LD 70 is not directly connected to the core, an influence of the return light can be reduced. In other words, since a laser light emitting surface of the visible light LD 70 is connected to the cladding of the optical fiber 30 by the pump light multiplexer 13, the return light that mainly propagates through the core can be prevented from being incident on the visible light LD 70. It is also possible to insert a filter or the like that transmits a visible laser light wavelength and cuts off an infrared laser wavelength into a pump light introduction fiber 71 to more positively prevent the return light from entering the visible light LD 70. In this case, in Equations (3) and (4), L1 may be defined as a loss in the visible laser light wavelength when coupling a core of an output fiber of the visible light LD 70 to a core of the optical fiber 32 via the pump light introduction fiber 71, and L2 may be defined as a similar loss in the infrared laser wavelength.

Note that, in the example shown in FIG. 4, although the pump light multiplexer 13 and the visible light LD 70 are connected directly with each other, for example, similarly to the case of FIG. 1, an attenuating section 12 may be provided between the pump light multiplexer 13 and the visible light LD 70.

(D) Fourth Embodiment

Figure 5:
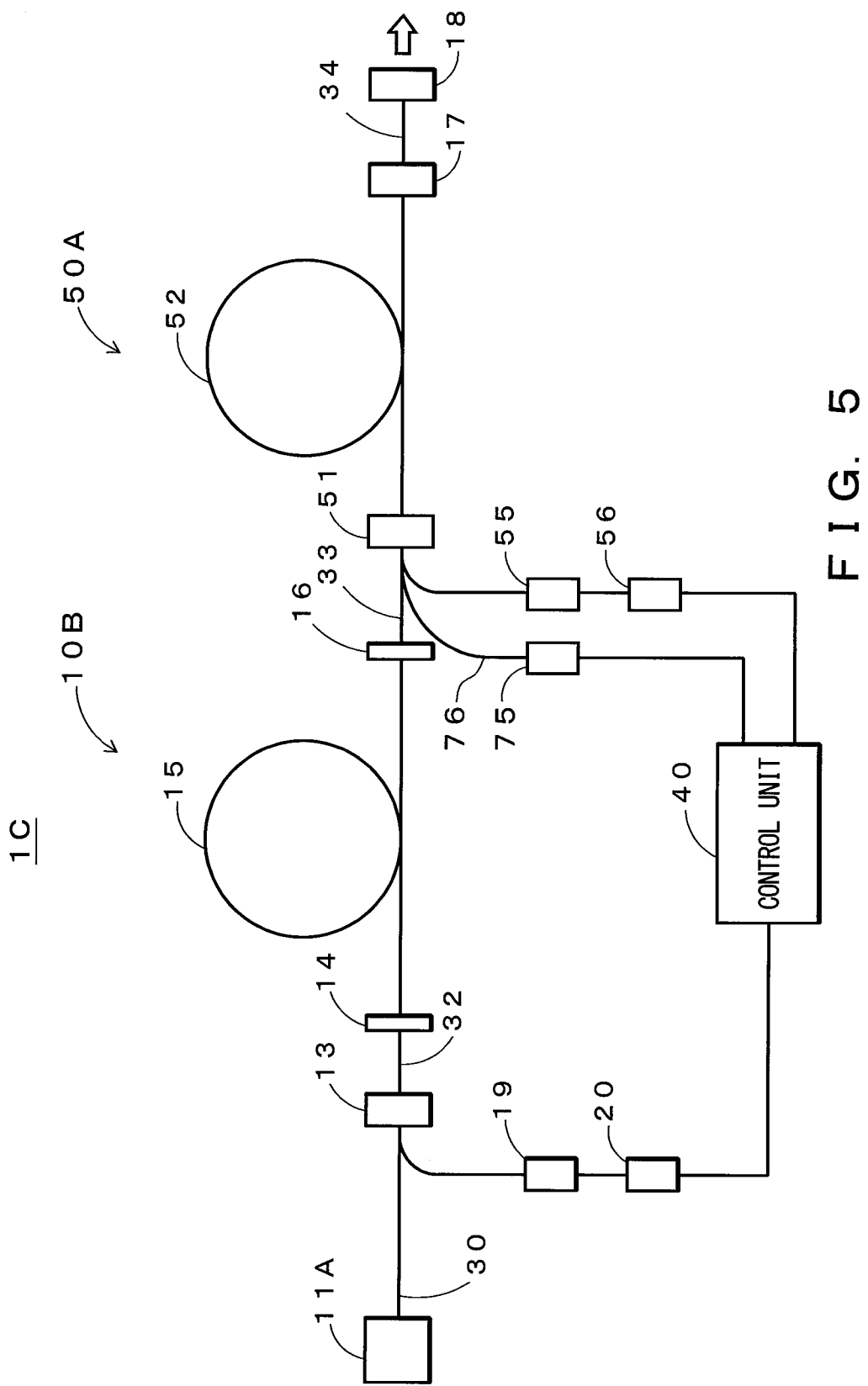
FIG. 5 is a diagram showing an exemplary configuration of a fourth embodiment of the present disclosure.

FIG. 5 is a diagram showing an exemplary configuration example of the fourth embodiment of the present disclosure. In FIG. 5, since components corresponding to those in FIG. 4 are labeled with the same reference numerals, an explanation thereof is omitted. As compared to the case of FIG. 4, in a fiber laser apparatus 1C of the fourth embodiment shown in FIG. 5, the visible light LD 70 is eliminated and a visible light LD 75 is newly added. Further, a laser amplifying device 50A is added on a downstream stage of a laser oscillation device 10B. The remaining configuration is similar to the configuration in FIG. 4.

In the example of FIG. 5, the visible laser light emitted by the visible light LD 75 is introduced into a pump light introduction fiber 76 of the pump light multiplexer 51. The visible laser light introduced into the pump light introduction fiber 76 is introduced into the cladding of the amplification optical fiber 52 by the pump light multiplexer 51. For example, a part of the visible laser light introduced into the cladding changes to a core propagation mode at a portion such as a fusion-bonded point where disturbance is caused in the propagating mode, to be introduced into the core by, and becomes core light that propagates through the core. In the cladding mode removing section 17, the visible laser light remaining in the cladding is removed and is irradiated onto a workpiece through light output section 18. Similarly to the embodiment of FIG. 4, the pump light introduction fiber 76 is one of the plurality of pump light introduction fibers of the pump light multiplexer 51, and serves to introduce pump light into the cladding of the amplification optical fiber 52.

In the fourth embodiment, since the attenuating section 12 is eliminated, it may be configured to satisfy equations in which the second part on the left-hand side related to the attenuation L of the attenuating section 12 is eliminated from Equations (2) and (5).

Note that, in the fourth embodiment shown in FIG. 5, since operations other than the operation in which the visible laser light is introduced into the pump light multiplexer 51 are similar to the case of the aforementioned FIG. 4, an explanation thereof is eliminated.

According to the fiber laser apparatus 1C of the fourth embodiment explained above, a part of light introduced into the cladding of the amplification optical fiber 52 by the pump light multiplexer 51 is introduced into the core while propagating. Thereby, similarly to the case of the first embodiment, the passage paths of the infrared laser light and the visible laser light can be matched and optical axes can be matched. Thereby, by matching the irradiation positions of the infrared laser light and the visible laser, it is possible to accurately know a position where the infrared laser light is to be irradiated and the alignment for the processing can be performed accurately. Also, since the light which has leaked from the core is removed by the cladding mode removing section 17, a beam quality of the visible laser light can be improved and a smaller spot diameter can be obtained.

Also, in the fourth embodiment, similarly to the case of the third embodiment, since the visible light LD 75 is not directly connected to the core, an influence of the return light can be reduced. In other words, since a laser light emitting part of the visible light LD 75 is connected to the cladding of the amplification optical fiber 52 by the pump light multiplexer 51, the return light that mainly propagates through the core can be prevented from being incident on the visible light LD 75.

In the example shown in FIG. 5, the pump light multiplexer 51 and the visible light LD 75 are directly connected via the pump light introduction fiber 76. However, for example, similarly to the case of FIG. 1, an attenuating section 12 may be provided between the pump light multiplexer 51 and the visible light LD 75.

(E) Fifth Embodiment

Figure 6:
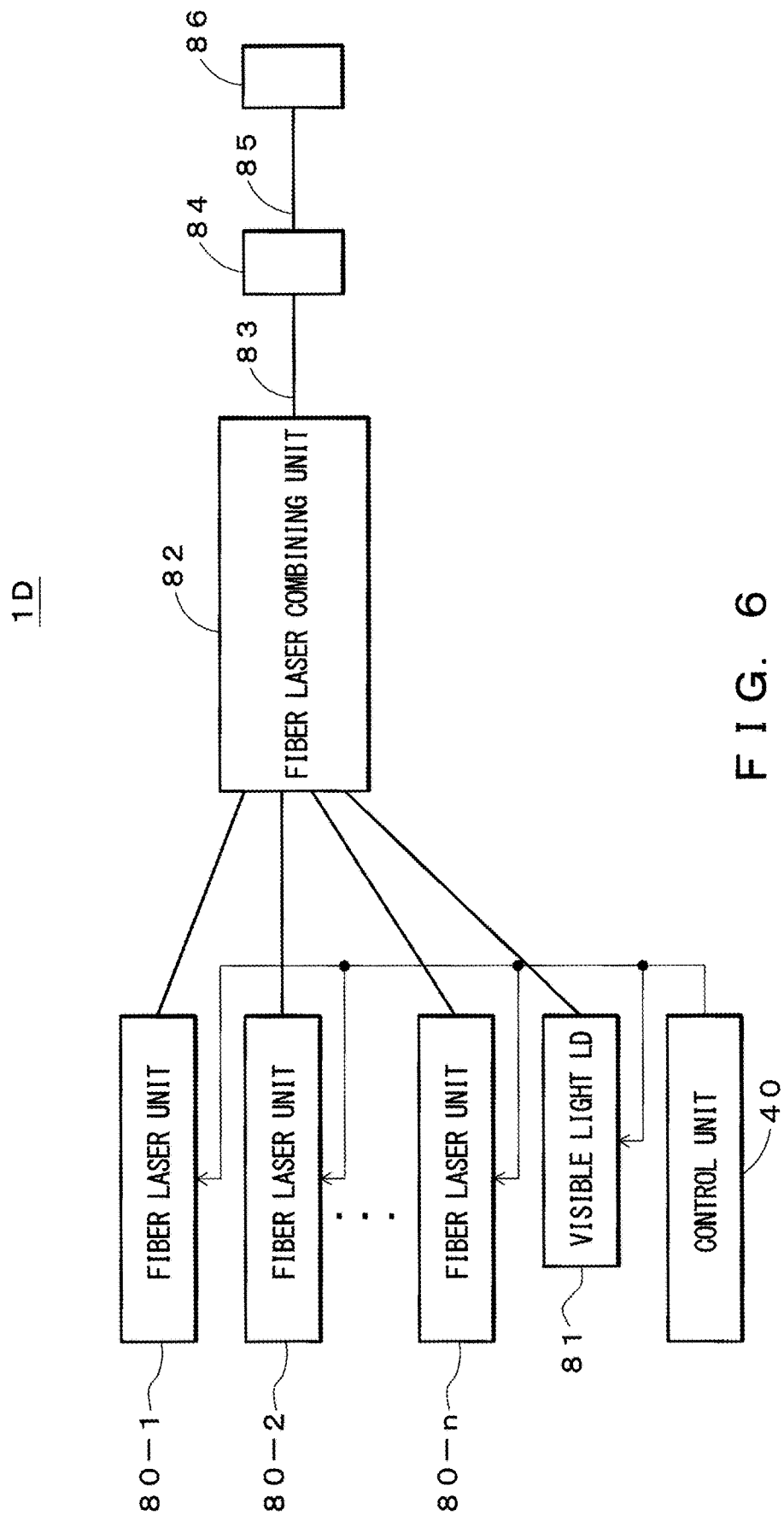
FIG. 6 is a diagram showing an exemplary configuration of a fifth embodiment of the present disclosure.

FIG. 6 is a diagram showing a configuration example of a fifth embodiment of the present disclosure. The fiber laser apparatus 1D of the fifth embodiment shown in FIG. 6 includes, as its main components, the control unit 40, fiber laser units 80-1 to 80-n, a visible light LD 81, a fiber laser combining unit 82, optical fibers 83 and 85, a cladding mode removing section 84 and a light output section 86.

The control unit 40 has a configuration similar to that of FIG. 2 and controls each part of the apparatus. The fiber laser units 80-1 to 80-n (n is, for example, a natural number which is greater than or equal to 1) is constituted by a fiber laser apparatus in which a portion associated with visible laser light is eliminated from the fiber laser apparatuses shown in FIGS. 1, 3 to 5. In other words, each fiber laser unit is configured as a single laser oscillation device or a combination of a laser oscillation device and a plurality of laser amplifying devices. Specifically, in the present embodiment, it is configured in such a manner that the visible light LD 11 and the attenuating section 12 are eliminated from the configuration of the first embodiment shown in FIG. 1. Note that, in the present embodiment, the fiber laser units 80-1 to 80-n are indicated as a plurality of fiber laser apparatuses, but only the fiber laser unit 80-1 and the visible light LD 81 may be connected to the fiber laser combining unit 82 (i.e., 80-2 to 80-n are not connected).

In either case, the fiber laser combining unit 82 is at least provided with two or more input units corresponding to the total number of devices connected, which includes the fiber laser unit(s) 80-1 (or 80-1 to 80-n) and the visible light LD 81. Further, by providing extra input units with respect to a total number of devices connected, a level of light returning to each input unit can be reduced to a reciprocal of the number of input units by dispersing the return light to each input unit. In this case, each extra input unit may be provided with a structure that performs a heat dissipation process after thermal conversion of the return light emitted therefrom.

The visible light LD 81 generates and outputs, for example, red laser light that is visible light. The fiber laser combining unit 82 combines the infrared laser light emitted from the fiber laser units 80-1 to 80-n and introduces it into a core of the optical fiber 83 and also introduces the visible laser light emitted from the visible light LD 81 into the core of the optical fiber 83.

The optical fibers 83 and 85 are, for example, constituted by optical fibers of a single-mode core or a multimode core and infrared laser light emitted from the fiber laser units 80-1 to 80-n and combined by the fiber laser combining unit 82 is propagated through the core thereof and the visible laser light emitted from the visible light LD 81 is similarly propagated through the core.

The cladding mode removing section 84 removes light that propagates through the cladding. The light output section 86 collects, on a workpiece, the infrared laser light or the visible laser light from which the cladding light is removed by the cladding mode removing section 84.

Next, an operation of the fifth embodiment will be described. In the fiber laser apparatus 1D of the fifth embodiment, when a workpiece is placed on a working table, not shown, and an operation for alignment for the control unit 40 is performed, the control unit 40 drives the visible light LD 81 and causes the visible laser light to emit. The visible laser light emitted from the visible light LD 81 is introduced into a core of the optical fiber 83 in fiber laser combining unit 82. A part of the visible laser light introduced into the core leaks from the core to the cladding, and the light leaked to the cladding is removed when passed through the cladding mode removing section 84, and it is irradiated to the workpiece from the light output section 86 via the optical fiber 85. Since the visible laser light emitted by the visible light LD 81 passes the path which is the same as that of the infrared laser light emitted by the fiber laser units 80-1 to 80-n, and its optical axis matches the optical axis of the infrared laser light, it is irradiated onto the same position as the infrared laser light. Therefore, the processing position of the workpiece can be positioned accurately by referring to the position where the visible laser light is irradiated.

When the alignment is completed, the control unit 40 stops driving the visible light LD 81 and drives the fiber laser units 80-1 to 80-n to emit infrared laser light. The infrared laser lights emitted from the fiber laser units 80-1 to 80-n are combined in the fiber laser combining unit 82 and then introduced into a core of the optical fiber 83. The cladding mode removing section 84 removes residual light remaining in the cladding and outputs from the light output section 86 via the optical fiber 85. The infrared laser light is irradiated on the same position as the visible laser light and can accurately process a target position of the workpiece.

As has been described above, according to the fifth embodiment, the alignment can be performed accurately by matching optical axes of the infrared laser lights emitted from a plurality of fiber laser units 80-1 to 80-n with an optical axis of the visible laser light. Also, an influence of the return light can be reduced by introducing the visible laser light into the core by the fiber laser combining unit 82. In other words, as in the first embodiment, when located upstream of the HR 14 (the left-hand side in the figure), the HR 14 reflects 99% of the laser light and passes about 1%. When an output of the laser oscillation device 10 is, for example, about 1 kW, light of about 10 W will be outputted as leak light from the HR 14. However, in the fifth embodiment, since such a leak light does not exist, a range of choices of the visible light LD 81 can be broadened. Further, the fiber laser combining unit 82 divides the return light reflected from the workpiece into n and outputs them, it has an effect of substantially attenuating the return light. Therefore, also from such a point of view, the range of choices of the visible light LD 81 can be broadened.

Figure 7:
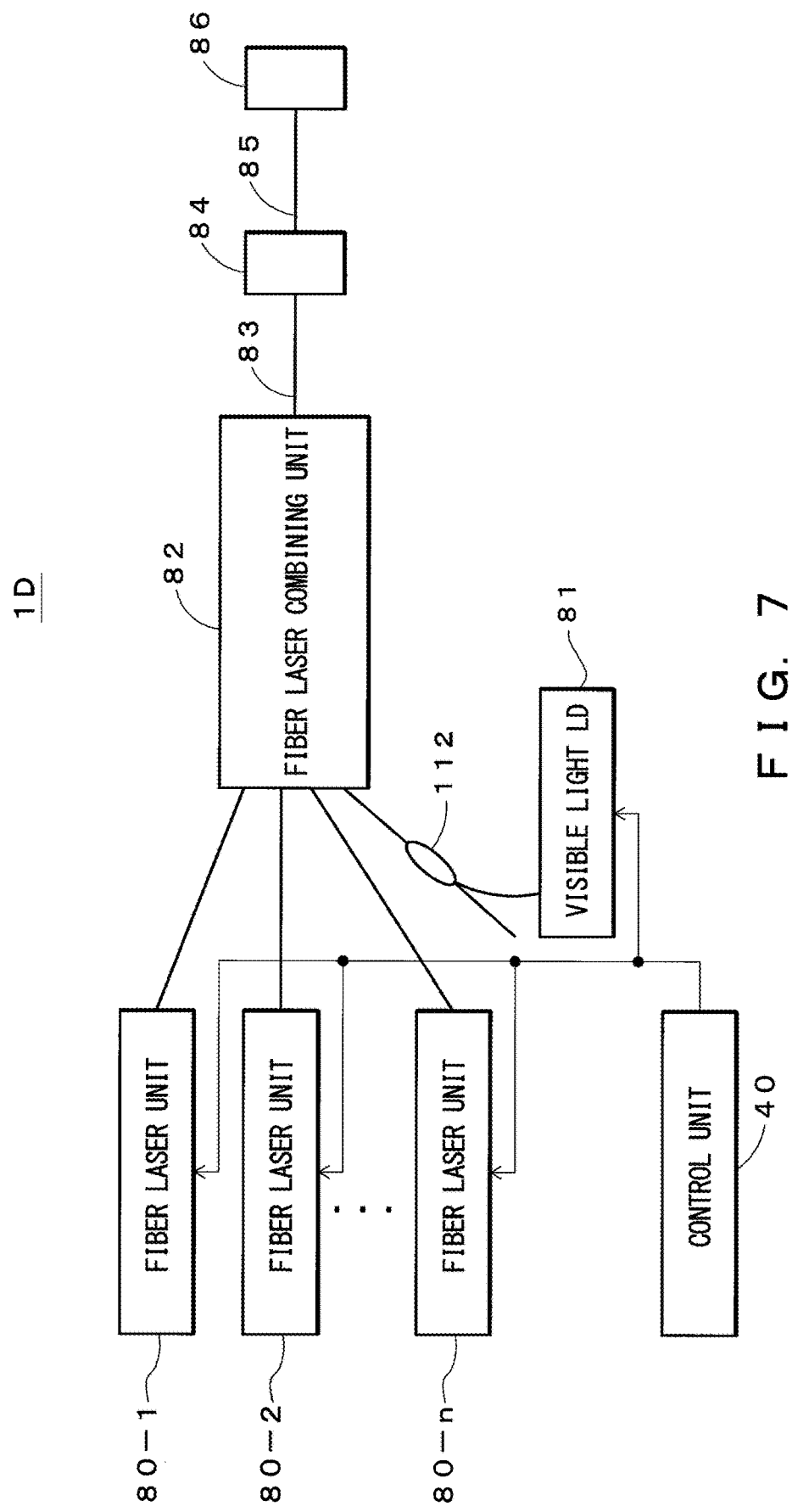
FIG. 7 is a diagram showing an exemplary configuration of a variant embodiment of the embodiment shown in FIG. 6.
Figure 10:
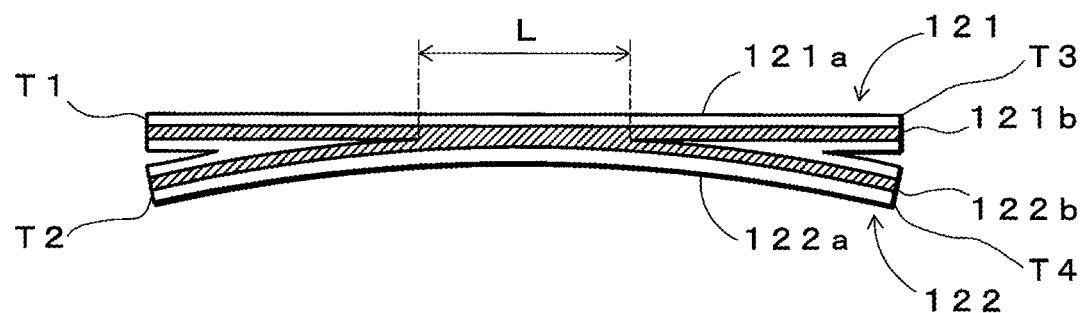
FIG. 10 is a diagram showing an exemplary configuration of a wavelength selective coupling-splitting element shown in FIG. 9.

Note that, in the aforementioned fifth embodiment, the visible light LD 81 is directly connected to an unused input end of the fiber laser combining unit 82. However, as shown in FIG. 7, it may be connected to the input end via a wavelength selective coupling-splitting element 112. The wavelength selective coupling-splitting element 112 has a configuration as shown in FIG. 10, and has four terminals T1 to T4. The terminal T2 is connected to the visible light LD 81, the terminal T3 is connected to the unused input end of the fiber laser combining unit 82, and the terminals T1 are T4 are each configured as an open end.

The wavelength selective coupling-splitting element 112 has a coupling loss of 1.8 dB for a wavelength range of the visible light between the terminals T3 and T2, and has a coupling loss of about 18 dB for a wavelength range of the invisible laser light. Also, in this case, it has a coupling loss of about 0.18 dB for a wavelength range of the invisible laser light between the terminals T3 and T1. In this manner, the visible laser light outputted from the visible light LD 81 is efficiently coupled to an input end of the fiber laser light combining unit 82, and, among return lights that propagate in a reverse direction in the input end of the fiber laser combining unit 82, regarding the invisible light, due to a loss between the terminals T3 to T2, since most of the optical power propagating to the terminal T2 is cut-off and propagated to the terminal T1 side, the visible light LD 81 can be prevented from being damaged with the return light. Also, between the terminal T2 of the wavelength selective coupling-splitting element 112 and the visible light LD 81 connected thereto, a wavelength selective filter may be placed that transmits a wavelength range of visible light and selectively attenuates a wavelength range of invisible laser light. For example, when an attenuating factor in a wavelength range of the invisible laser light is 30 dB, since an attenuating factor of a total of 48 dB is obtained with a coupling loss in the wavelength range of the wavelength selective coupling-splitting element 112, the invisible laser light returning to the visible light LD 81 can be further cut off.

Figure 8:
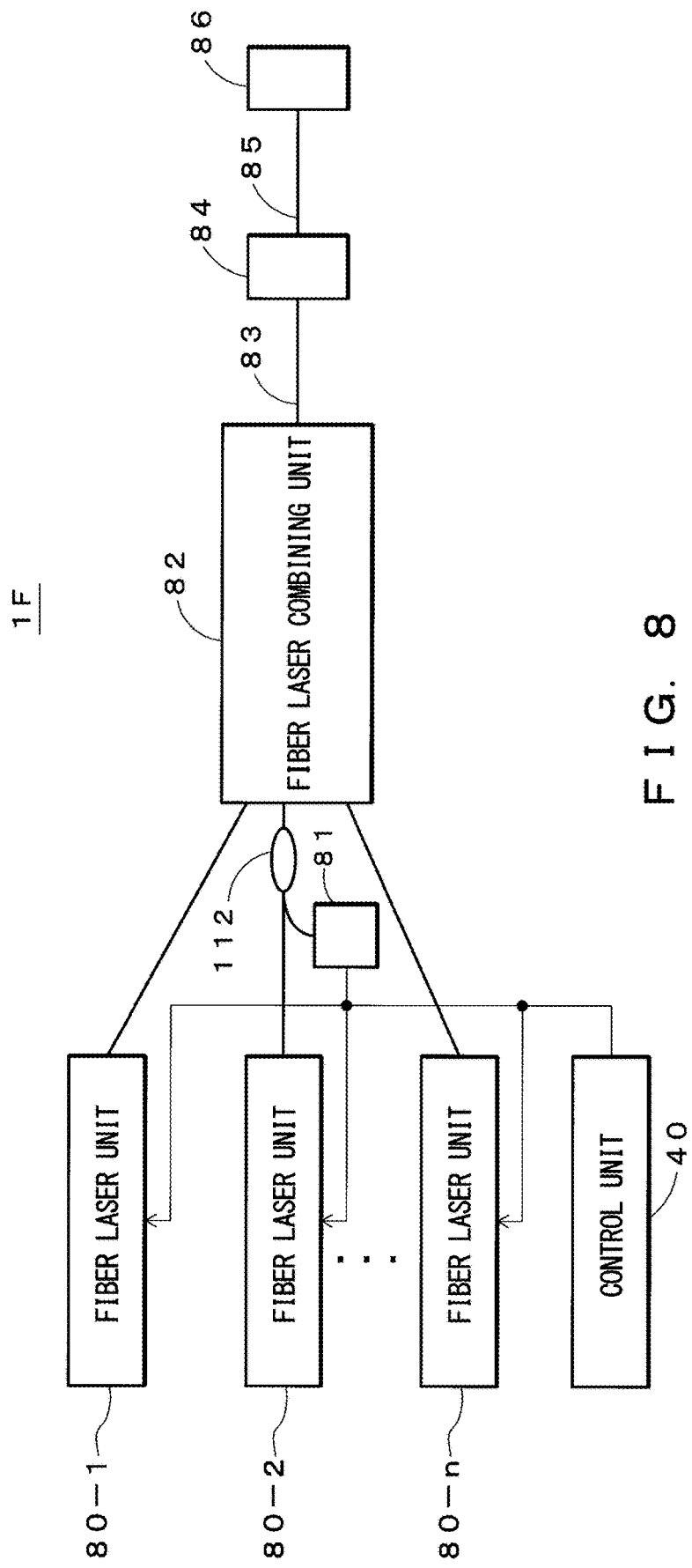
FIG. 8 is a diagram showing an exemplary configuration of a variant embodiment of the embodiment shown in FIG. 6.

Note that, in the example of FIG. 7, the wavelength selective coupling-splitting element 112 is connected to an unused input end. However, the wavelength selective coupling-splitting element 112 may be provided at an input end whereto a fiber laser unit is connected. FIG. 8 shows a variant embodiment in which the wavelength selective coupling-splitting element 112 is provided between the fiber laser unit 80-2 and an input end of the fiber laser combining unit 82. In the variant embodiment shown in FIG. 8, the terminal T1 of the wavelength selective coupling-splitting element 112 is connected to an output end of the fiber laser unit 80-2, the terminal T2 is connected to the visible light LD 81, the terminal T3 is connected to an input end of the fiber laser combining unit 82, and the terminal T4 is configured as an open end.

In the variant embodiment as shown in FIG. 8, the invisible laser light outputted from the fiber laser unit 80-2 is inputted into the fiber laser combining unit 82 with almost no loss (a loss of about 0.18 dB). Also, since the coupling loss for the visible laser light between the terminals T2 and T3 is about 1.8 dB, the visible laser light outputted by the visible light LD 81 can be guided to the fiber laser combining unit 82 with almost no loss. Further, among the return lights which propagates in the input end of the fiber laser combining unit 82 in a reverse direction, for the invisible light, due to a loss between the terminals T3 and T2, most of the light power propagating to the terminal T2 can be cut off, and by making it propagate to the terminal T1 side, the visible light LD 81 can be prevented from being damaged by the return light. In the example shown in FIG. 8, the wavelength selective coupling-splitting element 112 is provided on the output side of the fiber laser unit 80-2, but it may be provided on the output side other than the fiber laser unit 80-2. Also, in the example of FIG. 8, the wavelength selective coupling-splitting element 112 and the visible light LD 81 are provided at an output end of the fiber laser unit 80-2 only, but may also be provided at two or more output ends of the fiber laser units.

Comparing the embodiments shown in FIGS. 7 and 8, in the configuration of FIG. 7, since the invisible laser light from the fiber laser unit does not enter the wavelength selective coupling-splitting element 112, resistance to power which is required for the wavelength selective coupling-splitting element 112 can be mitigated.

(K) Sixth Embodiment

Figure 9:
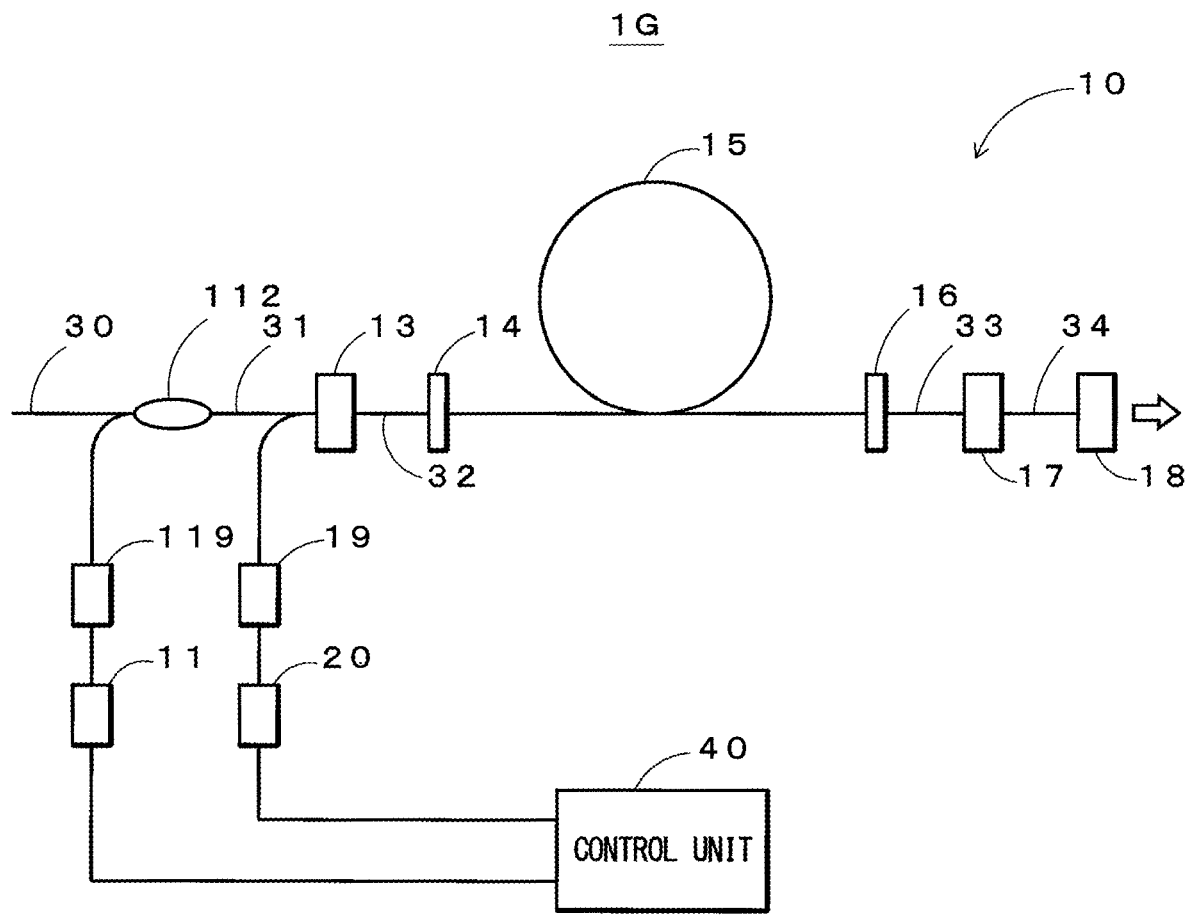
FIG. 9 is a diagram showing an exemplary configuration of a sixth embodiment of the present disclosure.

FIG. 9 is a diagram showing an exemplary configuration of a sixth embodiment of the present disclosure. As shown in FIG. 9, a fiber laser apparatus 1G of the sixth embodiment has, as its main constituent elements, the wavelength selective coupling-splitting element 112 (corresponds to an "introducing section" in the claims), the pump light multiplexer 13, the HR (High Reflector) 14, the amplification optical fiber 15, the OC (Output Coupler) 16, the cladding mode removing section 17, the light output section 18, a filter 119, the visible light LD 11 (corresponds to a "visible laser light source" in the claims), the amplification pumping LD (Laser Diode) 19, the pumping LD driving power supply 20, the optical fibers 30 to 33, the optical fiber 34 (corresponds to "output optical fiber" in the claims) and the control unit 40 (corresponds to a "drive unit" in the claims). Note that the pump light multiplexer 13, the HR 14, the amplification optical fiber 15 and the OC 16 are main constituent elements of the laser oscillation device 10.

Here, for example, the visible light LD 11 is constituted by a laser diode that generates, for example, red laser light of a wavelength of 638 nm, which is visible light. Also, as for the visible light LD 11, it is not limited to red as in the present embodiment, and visible light such as green may be used considering the visibility. The filter 119 is constituted by an optical filter (e.g., a SWPF (Short Wavelength Pass Filter) or BPF (Band Pass Filter) that has a pass band in a visible light range and a cut-off band in an infrared light range) that transmits visible light outputted by the visible light LD 11 and attenuates the return light propagated in a reverse direction in the core from the wavelength selective coupling-splitting element 112 while irradiating invisible laser light.

The wavelength selective coupling-splitting element 112 combines light that enters through the optical fiber 30 and light that enters through the filter 119, and emits it to the optical fiber 31. The wavelength selective coupling-splitting element 112 also separates the return light propagating through the optical fiber 31 in the reverse direction in response to the wavelength, emits the visible light on the filter 119 side, and emits the non-visible light on the optical fiber 30 side.

Here, the non-visible light is mainly composed of an invisible laser light wavelength (1,080 nm) to be described below. Further, in addition, it is also possible to include Raman scattered light produced on an approximately 60 nm long-wave side by the invisible laser light and Brillouin scattered light produced near the invisible laser light wavelength.

More specifically, as has been described with reference to FIG. 7, the wavelength selective coupling-splitting element 112 has a coupling loss of 1.8 dB for a wavelength range of the visible light between the terminals T3 and T2, and has a coupling loss of about 48 dB for a wavelength range of the invisible laser light. Also, in this case, it has a coupling loss of about 0.18 dB for a wavelength range of the invisible laser light between the terminals T3 and T1. In this manner, the visible laser light outputted from the visible light LD 11 is efficiently coupled to a light output section 18 side, and, among the return light that propagates in a reverse direction in the optical fiber 31, for the invisible light, most of its optical power propagating to the terminal T2 is cut off by a loss between the terminals T3 to T2 and propagating to the terminal T1 side, the visible light LD 11 can be prevented from being damaged by the return light.

Note that a thermal conversion unit may be connected to a terminal section (leftmost end of the optical fiber 30 in FIG. 9) of the optical fiber 30 upstream of the wavelength selective coupling-splitting element 112. The thermal conversion unit that performs thermal conversion of incident light when light output from the optical fiber end is incident on a metal material such as aluminum (Al), and dissipates heat after performing heat conversion of the return light of a high-power invisible laser light incident on the thermal conversion unit. The thermal conversion unit may be, other than the thermal conversion unit described above, for example, configured by providing an axis-offset fusion-bonded section near an optical fiber end and in which thermal conversion is performed by transmitting the leak light therefrom to the metal member or the like.

FIG. 10 is a diagram showing an exemplary configuration of the wavelength selective coupling-splitting element 112. As shown in FIG. 10, the wavelength selective coupling-splitting element 112 is constituted by two optical fibers 121 and 122. In the present embodiment, fibers having substantially the same characteristics of a cutoff wavelength of 920±50 nm, respectively, are used as the two optical fibers 121 and 122. Such an optical fiber is single-mode in a wavelength band of invisible laser light, but it is not limited thereto, since it is sufficient if the visible laser light is coupled to an extent that it is visible in the light output section 18. Of course, a different fiber may be used in such a manner that the optical fiber 122 becomes single mode in the wavelength band of the visible laser light. The two optical fibers 121 and 122 are coupled with a part of claddings 121a and 122a being fused and the cores 121b and 122b being fusion-bonded for a length L. Here, the terminal T1 (corresponds to "other input terminal" in the claims) is connected to the optical fiber 30, and the terminal T2 (corresponds to "one of the input terminals" in the claims) is connected to the filter 119, and the terminal T3 (corresponds to an "output terminal" in the claims) is connected to the optical fiber 31, and the terminal T4 is configured as a non-reflective end. With such a wavelength selective coupling-splitting element 112, a mode coupling occurs between the cores 121b and 122b, and an energy transfer is produced between the cores 121b and 122b. At this time, a wavelength dependency of a splitting ratio is determined by a distance between the cores 121b and 122b and a length where they are close to each other. Regarding the example of FIG. 9, between the terminals T2 and T3, since a mode coupling of the visible light (wavelength λ1) wavelength range becomes dominant between the core 122b and the core 121b, the visible light (wavelength λ1) entering through the terminal T2 is emitted with a relatively low loss from the terminal T3. Also, between the terminals T2 and T3, since a mode coupling in the wavelength range of the invisible laser light (wavelength λ2); λ2≠λ1, λ2>λ1 in the present embodiment) is suppressed, most of the return light which has entered through the terminal T3 is emitted on the terminal T1 side and, the return light emitted from the terminal T2 side is attenuated. It is to be noted the light propagating in the core 122b from the left to the right in the diagram is output from terminal T4 to outside. The terminal T4 may be a non-reflective end such that unnecessary light will not return.

The coupling characteristics for the invisible light of the wavelength selective coupling-splitting element 112 may be determined by the invisible laser light wavelength as described above or equivalent characteristics may be provided for the invisible light wavelength range including the scattered light wavelength. Thus, a breakage prevention effect of the visible light LD 11 can be further improved.

Note that, in each of the embodiments below, the filter 119 may be directly coupled to the core 122b of the terminal T1 of the wavelength selective coupling-splitting element 112 or may be configured as a pigtail-type having an output optical fiber and a core of the output optical fiber may be connected with the core 122b of the terminal T1. Note that, when it is configured as a pigtail-type, the output optical fiber may be a single-mode optical fiber.

The pump light multiplexer 13 is configured by, for example, a TFB (Tapered Fiber Bundle) and introduces laser light outputted by the pumping LD 19 into the cladding of the optical fiber as pump light. The HR 14 is a high reflection fiber grating (FBG) formed by periodically changing a refractive index of the optical fiber and reflects laser light from the amplification optical fiber 15 with a reflection near 100%. The amplification optical fiber 15 is, for example, a DCF (Double Clad Fiber) having a single-mode core doped with ions of rare earth elements such as Er (Erbium) and Yb (Ytterbium), and, for example, by pumping the ions doped in the core by pump light introduced from outside, infrared laser light of 1,080 nm is oscillated and outputted. Note that the DCF in the present embodiment includes two layers of claddings formed outside the previously described single-mode core and it is configured such that the pump light propagates inside the cladding, but the core is not limited to a single mode and may be a multimode (e.g., that propagates a fundamental mode and several low order modes) core.

Similarly to the HR 14, the OC 16 is formed by periodically changing a refractive index of the optical fiber and passes a part (e.g., 10%) of the laser light from the amplification optical fiber 15 and reflects the remainder. Note that an optical fiber resonator is constituted by the HR 14, the amplification optical fiber 15 and the OC 16.

The cladding mode removing section 17 removes light propagating through the cladding of the optical fiber 33. The cladding mode removing section 17 removes, for example, the cladding outside the double cladding and is formed by applying a substance having a refractive index high than the inside cladding at a part where the cladding has been removed. Of course, it may be any configuration other than this.

The pumping LD 19, for example, includes one or a plurality of multimode laser diodes having a wavelength of 915 nm, and having an output light intensity of greater than or equal to several Watts. The pumping LD driving power supply 20 drives the pumping LD 19 in response to the control of the control unit 40. The optical fibers 30 to 34 are constituted by, for example, a single-mode fiber and propagates laser light serving as the signal light.

The control unit 40 has a configuration similar to that of FIG. 2.

An output intensity of the visible light outputted from the light output section 18 is preferably, for example, greater than or equal to about 2 µW to ensure visibility. In order to facilitate the viewing of the visible light during use of the laser, it is desirable to set an output of the visible light LD 11 to be greater than or equal to 2 µW. In other words, the visible laser light emitted from the visible light LD 11 is irradiated onto a workpiece after being attenuated in the laser oscillation device 10, and an intensity of greater than or equal to 2 µW, which is an intensity that is visible even after attenuation, is ensured. Also, in order to prevent damages and shortening of life of the visible light LD 11, it is desirable set a characteristic of wavelength selective coupling-splitting element 112 and a characteristic of filter 119 such that an intensity of the return light that it is incident on the visible light LD 11 when the fiber laser apparatus 1G is irradiating infrared laser light is, for example, less than or equal to 10 mW.

Next, an operation of the sixth embodiment will be described. In a step prior to processing a workpiece, the control unit 40 controls operations of both the visible light LD 11 and the pumping LD 19 to be in a stopped state. In such a state, when a workpiece is placed on a working table, not shown, and an operation for determining the position (alignment) whereto the infrared laser light is to be irradiated is carried out (e.g., a "alignment button", not shown, is operated), the CPU 41 of the control unit 40 performs detection of this operation through the I/F 44. The CPU 41 executes a process of performing alignment based on program 42a. Specifically, the CPU 41 obtains control data from the data 42b based on the program 42a, and after having performed a D/A conversion by the I/F 44, delivers it to the visible light LD 11. As a result, for example, the visible light LD 11 emits red visible laser light. The laser light emitted by the visible light LD 11 enters the terminal T1 of the wavelength selective coupling-splitting element 112 via the filter 119. In the wavelength selective coupling-splitting element 112, the visible laser light which has entered the terminal T1 is transferred to the core 121b at a portion where the core 122b is fusion-bonded. The visible laser light transferred to core 121b is outputted from the terminal T3. The visible laser light outputted from the terminal T3 passes through the pump light multiplexer 13, the HR 14, the amplification optical fiber 15, the OC 16 and cladding mode removing section 17 and is emitted from the light output section 18, and is irradiated onto the working position (the place where the infrared laser light is irradiated) of the workpiece.

Here, similarly to the infrared laser light, the visible laser light passes through the optical fibers 31 to 34 and a core of the amplification optical fiber 15. Since the cores of the optical fibers 31 to 34 and the core of the amplification optical fiber 15 are single mode, the visible laser light and the infrared laser light have optical axes that matches with each other and the irradiation positions will not be offset. Also, since the visible laser light has a wavelength which is different from the wavelength of the infrared laser light with which the fiber laser apparatus 1G attempts to make it propagate in a single mode, a part of the visible laser light leaks from the core into the cladding or there is a component that leaks from the core into the cladding at a fusion-bonded point. However, since such laser light is removed when passing through the cladding mode removing section 17, a small spot diameter can be obtained without a focal point being blurred by light that is propagating in the cladding. Note that, although the visible laser light is attenuated when passing through the laser oscillation device 10, as has been described above, visibility can be ensured by setting the intensity of output light to be greater than or equal to 2 µW.

In this manner, prior to the processing, by irradiating the visible laser light irradiated from the visible light LD 11 to a position on the workpiece where the infrared laser light is to be irradiated, the processing position can be positioned accurately.

Note that in the fiber laser apparatus 1G, for example, by a so-called "fiber fuse" in which the core of the optical fiber is thermally changed irreversibly, the optical fibers 30 to 34, the amplification optical fiber 15 and other optical components may be damaged. In such a case, for example, since light does not propagate through the core, when the visible laser light is not emitted from the light output section 18, it can be determined that, for example, a fiber fuse has occurred. Also, when a fiber fuse occurs, the laser light propagates to the vicinity of a point where the fiber fuse reaches and the laser light is scattered at the point reached. Therefore, by identifying a position where the visible light is scattered, in it is possible to know how far the fiber fuse has progressed.

When the alignment is completed, the control unit 40 stops irradiation of the visible light LD 11. Thereby, irradiation of the visible laser light onto the workpiece is stopped. It is possible to start processing by irradiating the infrared laser light onto the workpiece without stopping the irradiation of the visible laser light. Subsequently, when an instruction to start the processing is given, the CPU 41 obtains data for driving the pumping LD 19 in response to an irradiation intensity from the data 42b, and delivers it to the I/F 44. The I/F 44 carries out D/A conversion of the delivered data for driving and delivers it to the pumping LD driving power supply 20. The pumping LD driving power supply 20 drives the pumping LD 19 in response to an instructed value supplied from the I/F 44. As a result, the pumping LD 19 emits pump light and introduces it into a cladding of the amplification optical fiber 15 via the pump light multiplexer 13. Thereby, laser oscillation occurs in the HR 14, the OC 16 and the amplification optical fiber 15. The infrared laser light is emitted from the OC 16, and after residual pump light is removed in the cladding mode removing section 17, it is irradiated onto a workpiece via the light output section 18. Since a position whereto the infrared laser light is irradiated is substantially the same as a position whereto the visible laser light is irradiated, a desired position can be processed by the infrared laser light. During the laser processing, for example, the light which has transmitted through the HR 14 becomes return light. Such return light enters the terminal T3 of the wavelength selective coupling-splitting element 112, and a major part thereof is emitted to the terminal T1 and almost not emitted on the terminal T2 side. Thereby, since the return light incident on the visible light LD 11 is kept at 10 mW or below, it is possible to prevent the visible light LD 11 from being damaged or the life from being shortened.

When a processing using the infrared laser light is completed, the CPU 41 stops driving the pumping LD 19. Thereby, irradiation of the infrared laser light from the fiber laser apparatus 1G is stopped.

As has been explained above, according to the sixth embodiment of the present disclosure, since the visible laser light emitted from the visible light LD 11 is introduced into the core of the optical fiber, passage paths of the infrared laser light and the visible laser light are made to be the same and coaxial, and the alignment can be performed accurately.

Also, in the aforementioned sixth embodiment, since the cladding mode removing section 17 is provided, by removing light leaking from the core, beam quality of the visible laser light can be improved and a reduced spot diameter can be obtained.

Also, in the aforementioned sixth embodiment, since wavelength selective coupling-splitting element 112 is provided, and an intensity of the return light emitted on the visible light LD 11 side during the processing is attenuated to a predetermined level, damages on the visible light LD 11 or a shortened life due to the return light can be prevented. Also, since an optical fused fiber type is used as the wavelength selective coupling-splitting element 112, the visible laser light can be introduced into a core of the fiber easily. Further, since the filter 119 is provided between the wavelength selective coupling-splitting element 112 and the visible light LD 11, even if the return light is outputted from the terminal T2 of the wavelength selective coupling-splitting element 112, it is possible to attenuate the intensity of light, and to prevent damages on the visible light LD 11 or a shortened life.

(L) Seventh Embodiment

Figure 11:
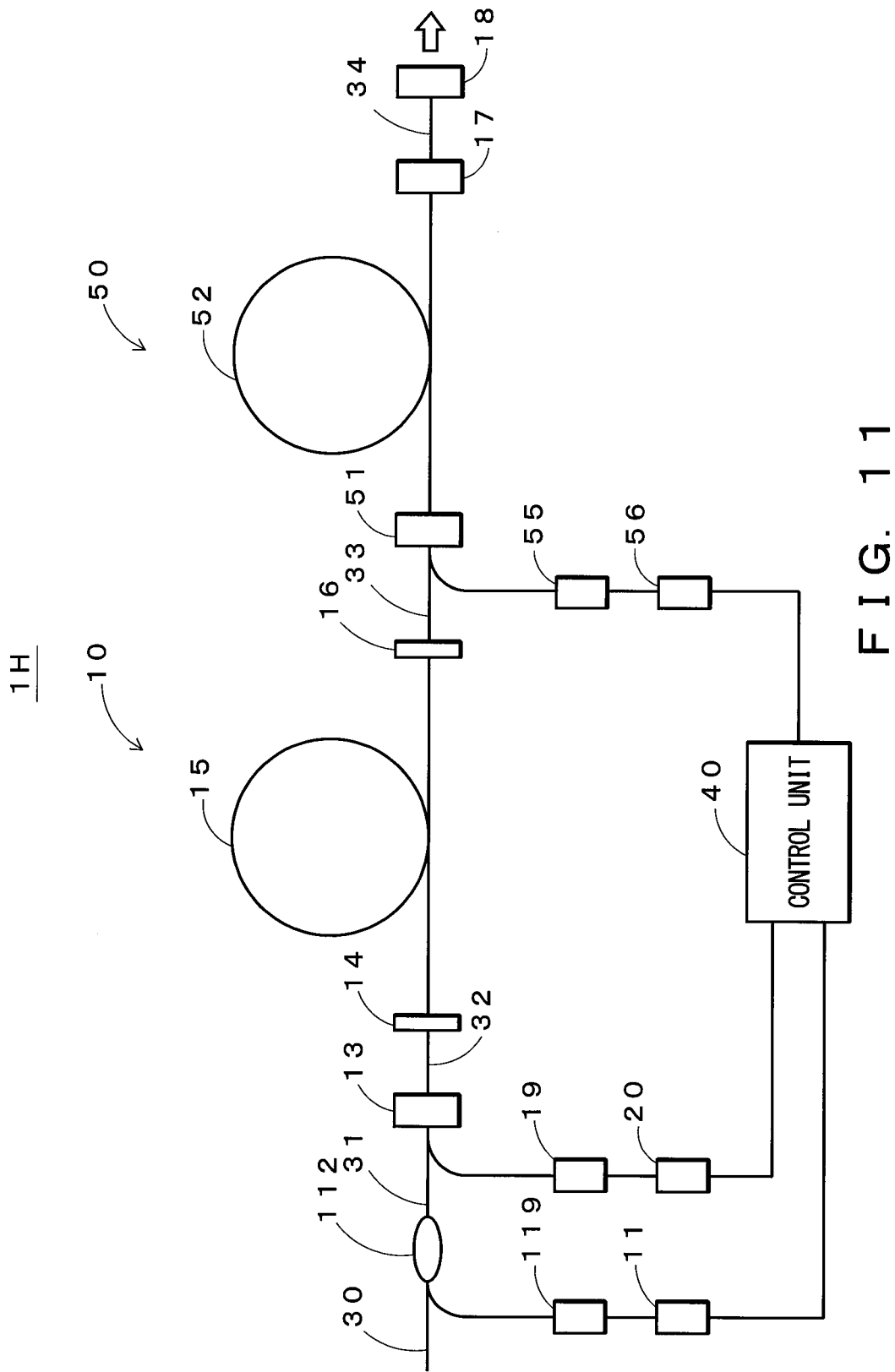
FIG. 11 is a diagram showing an exemplary configuration of a seventh embodiment of the present disclosure.

FIG. 11 is a diagram showing an exemplary configuration of the second embodiment of the present disclosure. In FIG. 11, since components corresponding to those in FIG. 9 are labeled with the same reference numerals, an explanation thereof is omitted. As compared to the case of FIG. 9, a fiber laser apparatus 1H of the seventh embodiment shown in FIG. 11 includes a laser amplifying device 50 that is added downstream of the laser oscillation device 10. The remaining configuration is similar to the configuration in FIG. 9. The laser amplifying device 50 includes a pump light multiplexer 51, an amplification optical fiber 52, a pumping LD 55 and a pumping LD driving power supply 56. Invisible laser light emitted from the laser oscillation device 10 is inputted into the core as signal light and pump light emitted from the pumping LD 55 enters the cladding. The signal light is amplified in the amplification optical fiber 52 and emitted via the light output section 18 after having removed the pump light in the cladding mode removing section 17. The control unit 40 obtains a light output of a desired intensity by controlling the pumping LD driving power supplies 20 and 56.

Note that, in the seventh embodiment, the visible laser light outputted from the visible light LD 11 may be attenuated in the laser amplifying device 50 as well as in the laser oscillation device 10. Therefore, it is necessary to set an intensity of the visible laser light after having passed the laser amplifying device 50 to be greater than or equal to 2 µW. Similarly to the case of the sixth embodiment, it is necessary to set the return light which it is incident on the visible light LD 11 from the filter 19 to be less than or equal to 10 mW.

An operation of the seventh embodiment is similar to the operation of the sixth embodiment except that the infrared laser light is amplified in the laser amplifying device 50. In the seventh embodiment, the visible laser light emitted from the visible light LD 11 enters the terminal T2 of the wavelength selective coupling-splitting element 112 via the filter 119 and it is introduced into a core of the amplification optical fiber 15 via the optical fiber 31 and the pump light multiplexer 13. The visible laser light emitted from the core of the amplification optical fiber 15 passes through the pump light multiplexer 51 and the amplification optical fiber 52 and after the light which has leaked into the cladding is removed by the cladding mode removing section 17, emitted towards a workpiece from the light output section 18 via the core of the optical fiber 34.

According to the fiber laser apparatus 1H of the seventh embodiment explained above, similarly to the sixth embodiment, by guiding the visible laser light to the core of the amplification optical fiber 15 through the optical fiber 31, the passage paths of the infrared laser light and the visible laser light can matched and optical axes can be matched. Thereby, by referring to an irradiation position of the visible laser light, it is possible to accurately know the position where the infrared laser light is to be irradiated. Therefore, the alignment for the processing can be performed accurately. Also, since the wavelength selective coupling-splitting element 112 is provided and the visible laser light is introduced into the core, it is possible to prevent the return light from being incident onto the visible light LD 11 and causing damages or shorten the life. Also, since the filter 119 is provided between the visible light LD 11 and the wavelength selective coupling-splitting element 112 to selectively attenuate return light, an intensity of the return light can be attenuated without decreasing an intensity of the visible laser light. Also, since the visible laser light which has leaked from the core is removed by providing the cladding mode removing section 17, a beam quality of the visible laser light is improved and a smaller spot diameter can be obtained.

(M) Eighth Embodiment

Figure 12:
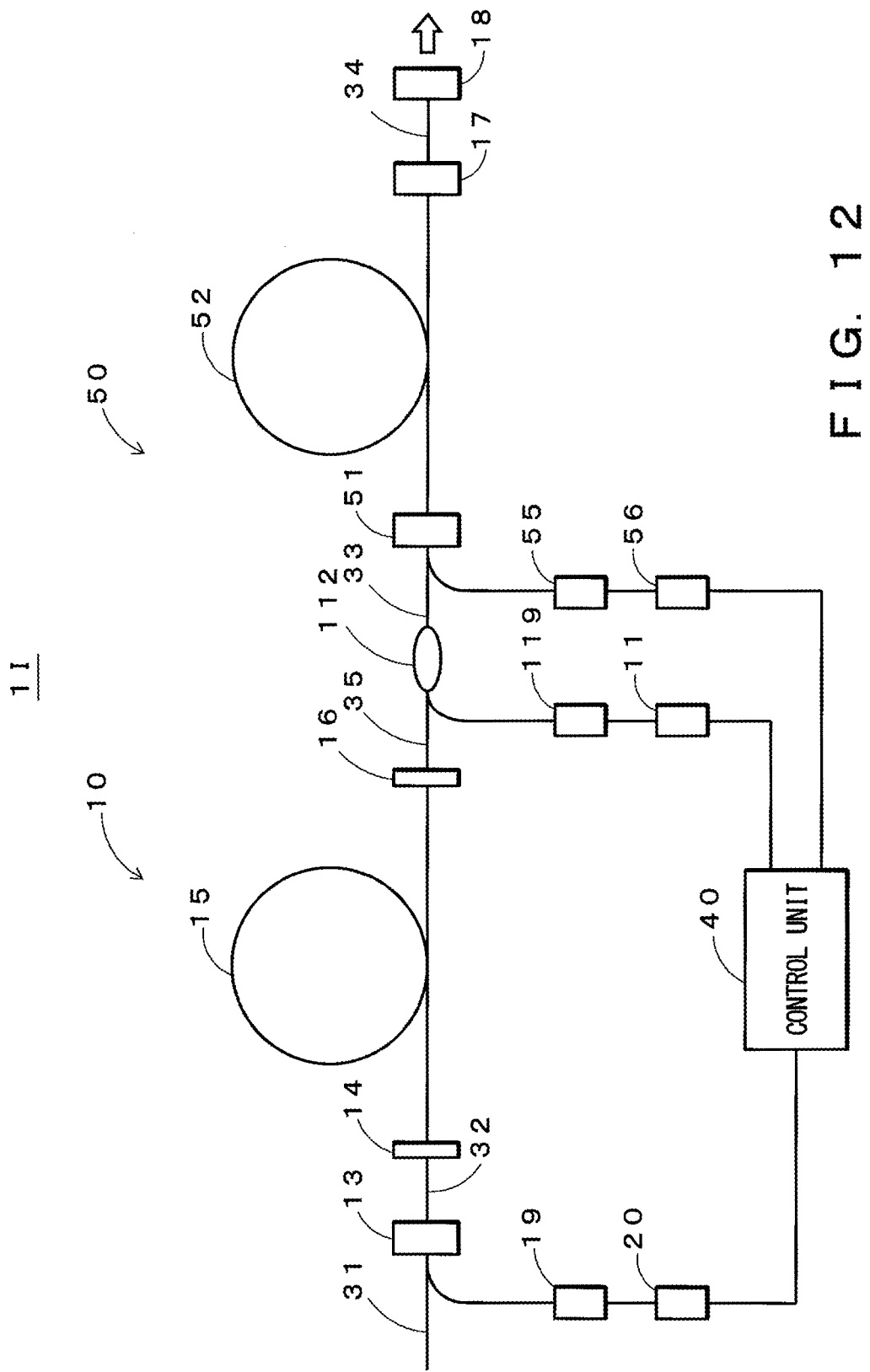
FIG. 12 is a diagram showing an exemplary configuration of an eighth embodiment of the present disclosure.

FIG. 12 is a diagram showing an exemplary configuration of the eighth embodiment of the present disclosure. In FIG. 12, since components corresponding to those in FIG. 11 are labeled with the same reference numerals, an explanation thereof is omitted. As compared to the case of FIG. 11, in a fiber laser apparatus 1I of the eighth embodiment shown in FIG. 12, a location of the wavelength selective coupling-splitting element 112 is changed from a location upstream of the pump light multiplexer 13 to a location between the OC 16 and the pump light multiplexer 51. The remaining configuration is similar to the configuration in FIG. 11.

An operation of the eighth embodiment will be described. The visible laser light emitted from the visible light LD 11 enters the core 122b from the terminal T2, transferred to the core 121b at a fusion-bonded portion, and emitted from the terminal T3. The visible laser light emitted from the terminal T3 is irradiated onto a workpiece via the pump light multiplexer 51, the amplification optical fiber 52, the cladding mode removing section 17 and the light output section 18. In this manner, by referring to a position of the visible laser light irradiated on a workpiece, a position where the infrared laser light is irradiated can be aligned.

When the alignment is completed, the irradiation of the infrared laser light is started. When the irradiation of the infrared laser light is started, the infrared laser light emitted by the OC 16 enters the terminal T1 of the wavelength selective coupling-splitting element 112, propagates through the core 121b, emitted from the terminal T3 and enters the pump light multiplexer 51. At this time, very little infrared laser light is outputted to the terminal T4 side. However, since the terminal T4 is a non-reflective end, it is outputted from the terminal T4 to the outside, and, for example, it is converted into heat. Therefore, the infrared laser light propagated to the terminal T4 is reflected and can be prevented from being incident on the visible light LD 11 via the terminal T2. The infrared laser light that has entered the pump light multiplexer 51 is amplified in the amplification optical fiber 52, and irradiated onto a workpiece via the cladding mode removing section 17 and the light output section 18.

As has been described above, in the eighth embodiment, the wavelength selective coupling-splitting element 112 is provided between the pump light multiplexer 51 and the OC 16. Therefore, as compared to the case of FIG. 11, since the visible laser light is outputted by passing through the laser amplifying device 50 only, when an output of the visible light LD 11 is the same as in the case of FIG. 11, visibility can be improved. Also, an output of the visible light LD 11 for obtaining the same visibility can be decreased.

In the eighth embodiment, since the wavelength selective coupling-splitting element 112 is provided between the laser oscillation device 10 and the laser amplifying device 50, an intensity of light can be decreased as compare to the case of FIG. 11. In other words, in the case of FIG. 11, the return light entering into the wavelength selective coupling-splitting element 112 is return light from both the laser oscillation device 10 and the laser amplifying device 50, and in the case of FIG. 12, since it is only the return light from the laser amplifying device 50 only, an intensity of the return light can be decreased. Particularly, in the laser oscillation device 10, the return light leaking from the HR 14 is at a level that is not negligible. However, in the case of FIG. 12, since the return light does not enter into the wavelength selective coupling-splitting element 112, an intensity of the return light incident on the visible light LD 11 can be decreased.

(N) Ninth Embodiment

Figure 13:
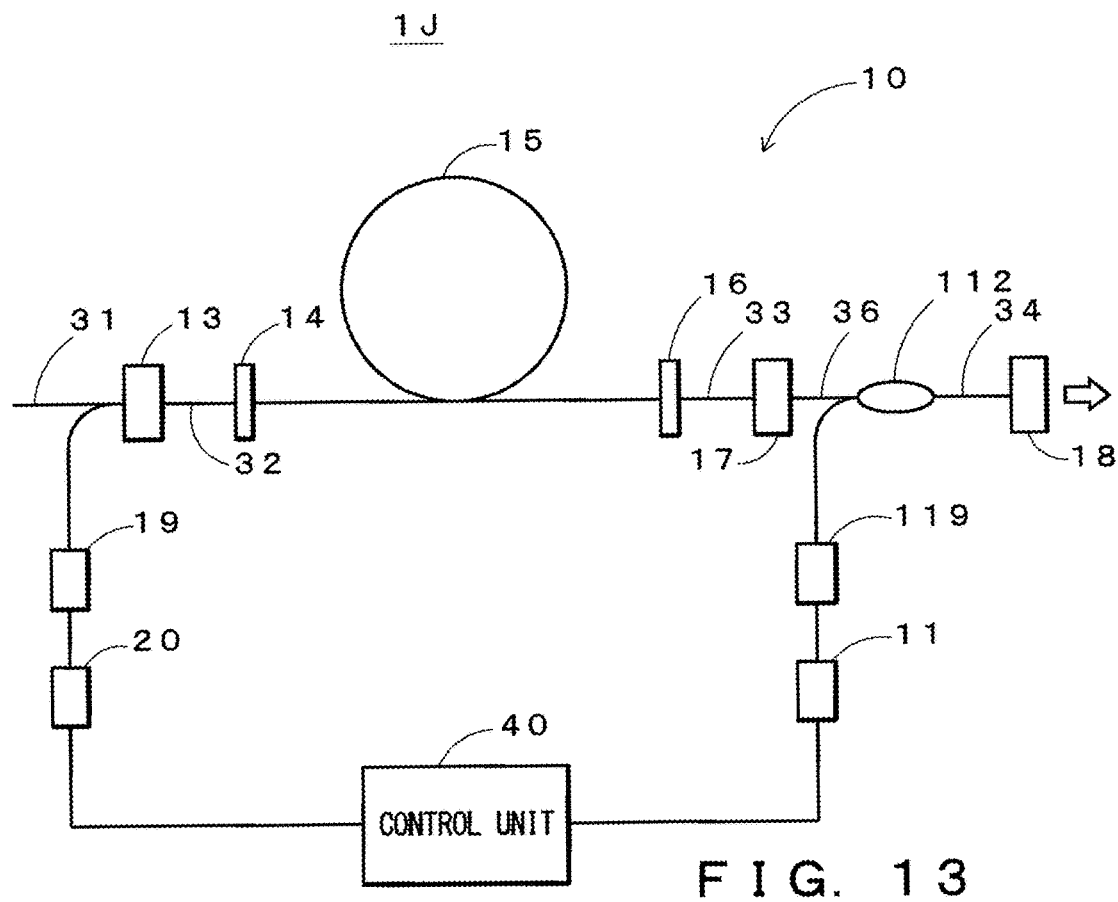
FIG. 13 is a diagram showing an exemplary configuration of a ninth embodiment of the present disclosure.

FIG. 13 is a diagram showing an exemplary configuration example of the ninth embodiment of the present disclosure. In FIG. 13, since components corresponding to those in FIG. 9 are labeled with the same reference numerals, an explanation thereof is omitted. As compared to the case of FIG. 9, in a fiber laser apparatus 1J of the ninth embodiment shown in FIG. 13, a location of the wavelength selective coupling-splitting element 112 is changed from a location upstream of the pump light multiplexer 13 to a location between the cladding mode removing section 17 and the light output section 18. The remaining configuration is similar to the configuration in FIG. 9.

An operation of the ninth embodiment will be described. In the ninth embodiment, the visible laser light outputted from the visible light LD 11 is enters the core 122b via the terminal T1 of the wavelength selective coupling-splitting element 112 via the filter 119, transferred to the core 121b in a fusion-bonded section, and outputted from the terminal T3. Since the visible laser light outputted from the terminal T3 is irradiated onto a workpiece via the light output section 18, alignment can be performed by adjusting its position.

When the alignment is completed and the irradiation of the infrared laser light is started, the infrared laser light outputted from the OC 16 enters the core 121b via the terminal T1 of the wavelength selective coupling-splitting element 112, propagated through the core 121b and outputted from the terminal T3. The infrared laser light outputted from the terminal T3 is irradiated onto a workpiece via the light output section 18. Thereby, the processing can be performed by irradiating the infrared laser light at a position that is positioned by the visible laser light.

As has been described above, in the ninth embodiment, since the wavelength selective coupling-splitting element 112 is provided between the cladding mode removing section 17 and the light output section 18 and the visible laser light is introduced, irradiation of the visible laser light onto a workpiece can be performed with a reduced attenuation and visibility can be improved. Also, an output of the visible light LD 11 required for obtaining a predetermined visibility can be reduced.

Further, in the ninth embodiment, as compared to the case of FIG. 9, an intensity of the return light can be reduced. In other words, in the ninth embodiment, as compared to the case of FIG. 9, since there is no influence of the return light leaking from the HR 14, an intensity of the return light entering into the wavelength selective coupling-splitting element 112 can be reduced.

(O) Tenth Embodiment

Figure 14:
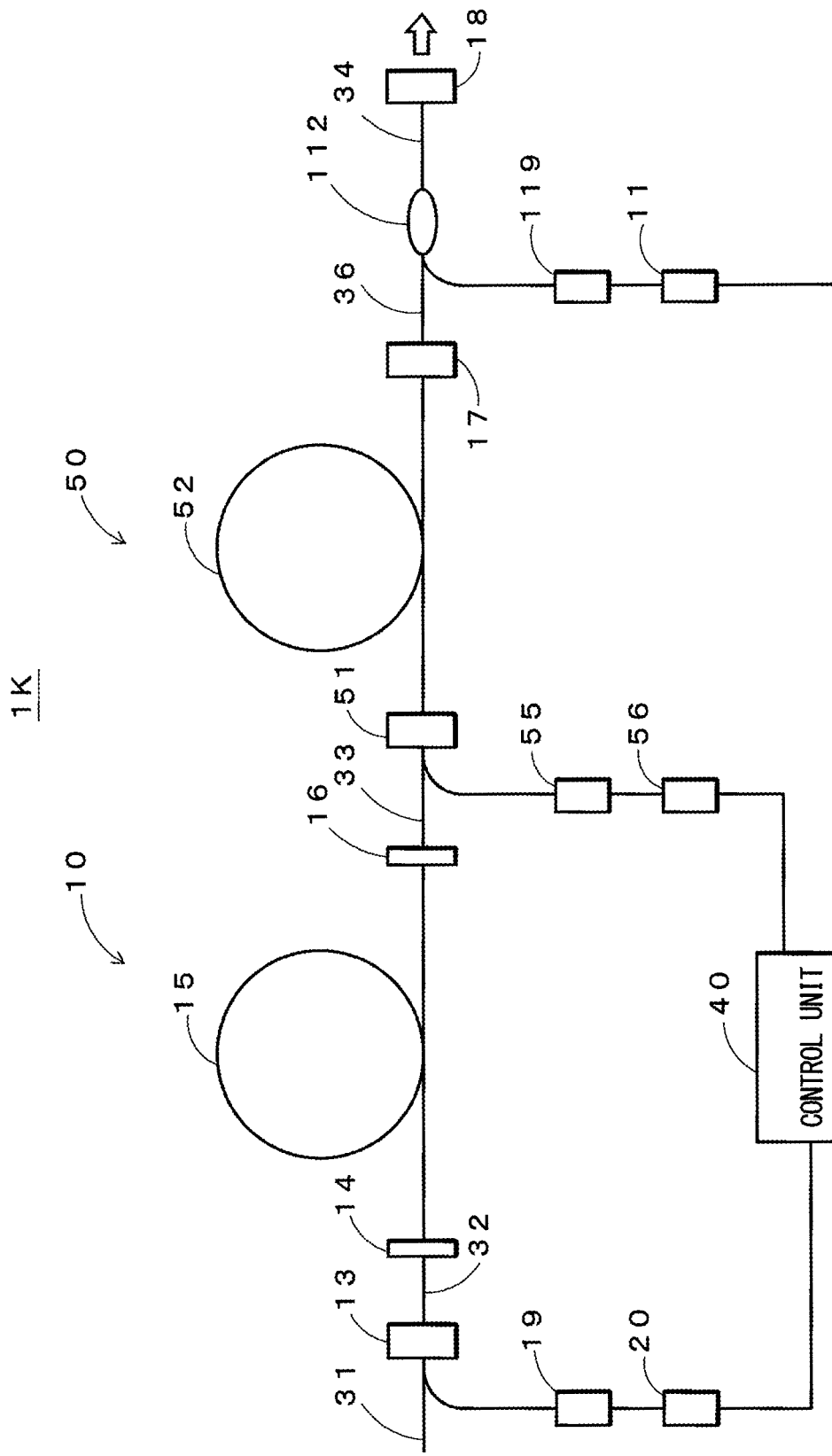
FIG. 14 is a diagram showing an exemplary configuration of a tenth embodiment of the present disclosure.

FIG. 14 is a diagram showing an exemplary configuration example of the tenth embodiment of the present disclosure. In FIG. 14, since components corresponding to those in FIG. 11 are labeled with the same reference numerals, an explanation thereof is omitted. As compared to the case of FIG. 11, in a fiber laser apparatus 1K of the ninth embodiment shown in FIG. 14, a location of the wavelength selective coupling-splitting element 112 is change from a location upstream of the pump light multiplexer 13 to a location between the cladding mode removing section 17 and the light output section 18. The remaining configuration is similar to the configuration in FIG. 11.

An operation of the tenth embodiment will be described. In the tenth embodiment, similarly to the ninth embodiment shown in FIG. 13, the visible laser light is emitted from the light output section 18 via the wavelength selective coupling-splitting element 112, and irradiated onto a workpiece. The alignment of the workpiece can be performed by referring to an irradiation position of such a visible laser light.

On the other hand, the infrared laser light outputted from the laser oscillation device 10 is amplified by the laser amplifying device 50 and enters the terminal T1 of the wavelength selective coupling-splitting element 112. In the wavelength selective coupling-splitting element 112, the infrared laser light that has entered the terminal T1 propagates through the core 121b and is emitted from the terminal T3, and is irradiated onto a workpiece from the light output section 18. Since the position where the infrared laser light is irradiated is generally the same as the position where the visible laser light is irradiated, the desired position can be processed by the infrared laser light.

As has been described above, in the tenth embodiment, the wavelength selective coupling-splitting element 112 is provided between the cladding mode removing section 17 and the light output section 18, and the visible laser light is introduced. Therefore, even if the laser amplifying device 50 is provided, since irradiation of the visible laser light onto a workpiece can be performed with a reduced attenuation, visibility can be improved. Also, an output of the visible light LD 11 required for obtaining a predetermined visibility can be reduced.

Further, in the tenth embodiment, as compared to the case of FIGS. 11 and 12, an intensity of the return light can be reduced. In other words, in the tenth embodiment, as compared to the case of FIGS. 11 and 12, since there is no influence of the return light from both the laser oscillation apparatus 10 and the laser amplifying device 50, an intensity of the return light entering into the wavelength selective coupling-splitting element 112 can be reduced.

(P) Variant Embodiment

The aforementioned embodiments are shown by way of example only, and other variant embodiments are conceivable. For example, in the second and fourth embodiments, the laser amplifying device is configured as a single stage configuration, but it is possible to provide two or more stages. In such a case, in the second embodiment, since a loss (a value of the third part in Equation (1)) increases along with an increase in the number of stages of the amplifying device, it is necessary to increase an output of the visible light LD 11 accordingly. In the fourth embodiment, for example, the visible light LD may be connected to the pump light multiplexer of the laser amplifying device of the last stage.

In the third embodiment, in a case of a forward pumping has been described as an example, but the present disclosure is applicable to bidirectional pumping or backward pumping. In other words, in the case of bidirectional pumping, the visible light LD may be connected to a pump light multiplexer for forward pumping or backward pumping and the visible laser light may be introduced into the cladding. In the case of a backward pumping, a visible light LD may be connected to the pump light multiplexer for a backward pumping and the visible laser light may be introduced into the cladding. In this case, a FBG that reflects visible laser light may be provided on the core at a position upstream of the pump light multiplexer for backward pumping so as to increase an output power of the visible laser light. In the fourth embodiment, the visible laser light is introduced into the pump light multiplexer 51. However, the visible laser light may be introduced into the pump light multiplexer 13. Also, similarly to the case of the third embodiment, in a case where the laser oscillation device 10B is a backward pumping or bidirection pumping type, the visible laser light may enter into either a forward pumping or backward pumping type pump light multiplexer, or in a case where the laser amplifying device 50A is a backward pumping or bidirection pumping type, the visible laser light may enter into either a forward pumping or backward pumping type pump light multiplexer.

In each aforementioned embodiment, red laser light was used for visible light LD, but, for example, green laser light may be used. Note that, since human eye have a higher sensitivity to green light than red light, the right hand side of Equation (1) can be set to a value lower than 2 μW. More specifically, according to the standard luminous efficiency curve, human eye senses a wavelength of around wavelength 555 nm as the brightest, and the sensitivity drops to about ⅕ to ⅒ with red that has a longer wavelength than 555 nm (e.g., a wavelength of 635 to 690 nm). Therefore, for example, when using a green visible light LD having a wavelength of around 555 nm, the right hand side of the Equation (1) is assumed to be 1 μW to several μW.

In the aforementioned first and second embodiments, the attenuating section 12 was provided. Of course, when an intensity of the return light is sufficiently low, the attenuating section 12 can be eliminated.

In each of the aforementioned embodiments, the pumping LD is driven by the pumping LD driving power supply. However, the control unit 40 may directly drive each pumping LD or may control FET (Field Effect Transistor) based on the control signal from the control unit and may control an electric current flowing in each of the pumping LDs by the FET.

In the sixth and the ninth embodiments shown in FIGS. 9 and 13, the laser oscillation device 10 of a forward pumping type is taken as an example, but it may be a backward pumping type or bidirection pumping type. Also, in the seventh, eighth and tenth embodiments shown in FIGS. 11, 12, and 14, description was made by taking an example in which both of the laser oscillation device 10 and the laser amplifying device 50 are a forward pumping type. However, it is also possible to selected one of a forward pumping, a backward pumping and a bidirection pumping for each of the laser oscillation device 10 and the laser amplifying device 50 and make an appropriate combination.

In the sixth to tenth embodiments, the filter 119 is provided between the visible light LD 11 and the wavelength selective coupling-splitting element 112. However, it is possible to eliminate the filter 119, in a case where an intensity of the return light is low. Instead of the filter 119, it is also possible to provide an attenuator that does not have a wavelength characteristic, and set an attenuation in such a manner that an intensity of the return light that is incident on the visible light LD 11 becomes 10 mW or less, and to set an output intensity of the visible light LD 11 in such a manner that an intensity of the visible laser light irradiated on a workpiece is greater than or equal to 2 μW.

In the seventh, eighth and tenth embodiments, the laser amplifying device is configured as a one stage configuration, but it is also possible to provide two stages.

In each of the aforementioned embodiments, a wavelength selective coupling-splitting element of a "fused type" is used. However, other than this, for example, a "polished type" wavelength selective coupling-splitting element in which the claddings of two optical fibers are partially removed by polishing and cores are arranged close to each other. With the wavelength selective coupling-splitting element of the polished type, an effect similar to that of the fused type can be obtained.

As a wavelength selective coupling-splitting element, it is also possible to use a space coupled system in which a dielectric multilayer filter is provided between fiber collimators. Note that, as for a "fused type" and a "polished type", since wavelength selection can be performed without a space coupled system, there is an advantage that an occurrence of damages causes by power concentration at input/emit end can be reduced even if the level of the return light is high.

Figure 15:
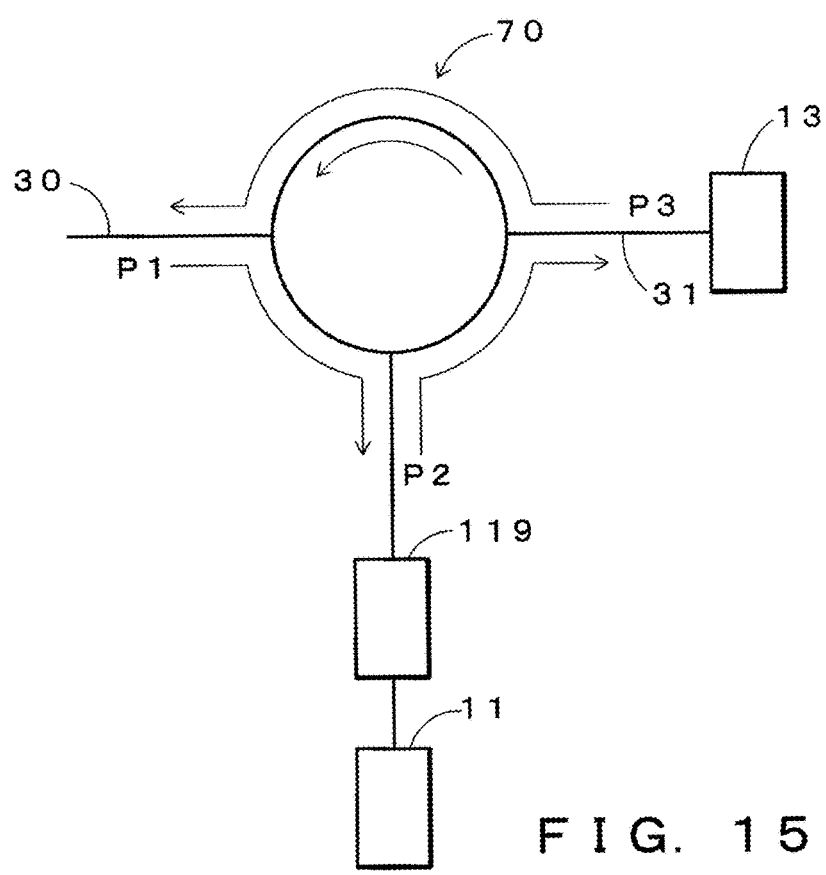
FIG. 15 is a diagram showing a variant embodiment of the present disclosure.

In the aforementioned sixth and seventh embodiments, the wavelength selective coupling-splitting element 112 is used. However, it is also possible to use, for example, an optical circulator 70 as shown in FIG. 15. The optical circulator 70 emits, from a port P2, light that has entered through a port P1, emits, from a port P3, light that has entered through the port P2, and emits, from the port P1, light that has entered through the port P3. Therefore, by connecting the filter 119 and the visible light LD 11 to the port P2 and connecting the pump light multiplexer 13 to the port P3, the visible laser light emitted from the visible light LD 11 is emitted through the port P3 and entered the pump light multiplexer 13. The return light that enters the port P3 is not propagated to the port P2 side and emitted through the port P1. Thereby, the return light can be prevented from being incident on the visible light LD 11.

What is claimed is:

1. A fiber laser apparatus that generates invisible laser light using an amplification optical fiber having a core that propagates a fundamental mode and low-order modes, and outputs the invisible laser light through an output optical fiber, the fiber laser apparatus comprising:
    a visible laser light source that generates visible laser light;
    an introducing section that introduces the visible laser light generated by the visible laser light source into the core of the amplification optical fiber, the introducing section having a wavelength selective coupling-splitting element having at least two input terminals and one output terminal, wherein the visible laser light from the visible laser light source enters one of the input terminals and laser light which is emitted from the output terminal is introduced into the core of the amplification optical fiber, and return light which propagates through the core in a reverse direction during generation of the invisible laser light to be incident on the output terminal propagates to the other input terminal while the return light which propagates to the one input terminal is attenuated;
    a cladding light attenuating section that attenuates light which has propagated through a cladding of the amplification optical fiber, at a subsequent stage of the amplification optical fiber; and
    a drive unit that drives the visible laser light source to emit the visible laser light through a core of the output optical fiber in a case of performing alignment of an irradiation position of the invisible laser light with respect to a workpiece.

2. The fiber laser apparatus according to claim 1, wherein the introducing section introduces the visible laser light generated by the visible laser light source into the core of the amplification optical fiber, and attenuates return light which propagates through the core in a reverse direction during generation of the invisible laser light to be incident on the visible laser light source.

3. The fiber laser apparatus according to claim 1, comprising an optical resonator that generates the invisible laser light, wherein
    the wavelength selective coupling-splitting element is provided on a preceding stage side of the optical resonator.

4. The fiber laser apparatus according to claim 1, wherein the introducing section has an optical fiber that connects an emitting section of the visible laser light source with a core of the amplification optical fiber.

5. The fiber laser apparatus according to claim 1, comprising an optical resonator that generates the invisible laser light.

6. The fiber laser apparatus according to claim 1, wherein the introducing section has a pump light multiplexer that connects an emitting section of the visible laser light source with a cladding of the amplification optical fiber.

7. The fiber laser apparatus according to any one of claim 1, wherein a wavelength of the visible laser light has a wavelength corresponding to red or green.

8. A fiber laser apparatus that generates invisible laser light using an amplification optical fiber having a core that propagates a fundamental mode and low- order modes, and outputs the invisible laser light through an output optical fiber, the fiber laser apparatus comprising:
    a visible laser light source that generates visible laser light;
    an introducing section that introduces the visible laser light generated by the visible laser light source into a core of the output optical fiber; and
    a drive unit that drives the visible laser light source to emit the visible laser light through the core of the output optical fiber in a case of performing alignment of an irradiation position of the invisible laser light with respect to a workpiece, wherein
    the introducing section attenuates return light which propagates through the core in a reverse direction during generation of the invisible laser light to be incident on the visible laser light source, and
    the introducing section has a wavelength selective coupling-splitting element having at least two input terminals and one output terminal, wherein
    the visible laser light from the visible laser light source enters one of the input terminals, and laser light which is emitted from the output terminal is introduced into the core of the output optical fiber, and
    return light which propagates through the core in the reverse direction during generation of the invisible laser light to be incident on the output terminal propagates to the other input terminal, while the return light which propagates to the one input terminal is attenuated.

9. The fiber laser apparatus according to claim 8, wherein the return light is an invisible light that has an invisible laser light wavelength and also includes at least one of Raman scattered light generated by the invisible laser light on a longwave side thereof and Brillouin scattered light generated near the invisible laser light wavelength.

10. The fiber laser apparatus according to claim 8, wherein the wavelength selective coupling-splitting element is one of a fused fiber type and a polished type.

11. The fiber laser apparatus according to claim 8, comprising an optical resonator that generates the invisible laser light, wherein
    the wavelength selective coupling-splitting element is provided on an output side of the optical resonator.

12. The fiber laser apparatus according to claim 11, wherein the optical resonator comprises a high reflection fiber grating (FBG) on both sides of the amplification optical fiber.

13. The fiber laser apparatus according to claim 8, further comprising a filter that attenuates the return light propagating from the wavelength selective coupling-splitting element to one of the input terminals, a pass-band of the filter being visible light, the filter being provided between the visible laser light source and the wavelength selective coupling-splitting element.

14. The fiber laser apparatus according to claim 13, wherein a core light attenuating section that attenuates core light is disposed between the visible laser light source and the introducing section.

15. The fiber laser apparatus according to claim 13, wherein an optical filter that transmits the visible laser light and attenuates the invisible laser light is disposed between the visible laser light source and the introducing section.

16. A fiber laser apparatus that generates invisible laser light using an amplification optical fiber and outputs the invisible laser light through an output optical fiber, the fiber laser apparatus comprising:

a plurality of the amplification optical fibers that generate the invisible laser light;

a combining unit that receives and combines the invisible laser light outputted from the plurality of amplification optical fibers and inputted via a plurality of input ends, and outputs the invisible laser light from a core of the output optical fiber;

an introducing section that introduces visible laser light generated by a visible laser light source, the introducing section having a wavelength selective coupling-splitting element having at least two input terminals and one output terminal, wherein the visible laser light from the visible laser light source enters one of the input terminals and the visible laser light which is emitted from the output terminal is inputted to the input end of the combining unit into which the invisible laser light is not inputted; and a drive unit that causes the visible laser light to be emitted through the core of the output optical fiber in a case of performing alignment of an irradiation position of the invisible laser light with respect to a workpiece, wherein the introducing section introduces the visible laser light into one of the plurality of input ends of the combining unit.

17. The fiber laser apparatus according to claim 16, wherein the amplification optical fiber has a core that propagates a fundamental mode and low-order modes.

18. The fiber laser apparatus according to claim 16, wherein the amplification optical fiber has a single-mode core.

19. The fiber laser apparatus according to claim 16, wherein the introducing section introduces the visible laser light into an input end whereto invisible laser light from the amplification optical fiber is not inputted, among the plurality of input ends of the combining units.

20. The fiber laser apparatus according to claim 16, wherein the introducing section introduces the visible laser light into the input end into which the invisible laser light from the amplification optical fiber is inputted.

21. The fiber laser apparatus according to claim 16, wherein the introducing section attenuates return light which propagates through the core in a reverse direction during generation of the invisible laser light to be incident on the visible laser light source.

22. The fiber laser apparatus according to claim 16, wherein the wavelength selective coupling-splitting element is of a fiber fused type or a polished type.

* * * * *